(12) United States Patent
Organ et al.

(10) Patent No.: US 9,134,187 B1
(45) Date of Patent: Sep. 15, 2015

(54) FORCE SENSING MULTI-AXIS GIMBALED DEVICE

(71) Applicant: Advanced Input Devices, Inc., Coeur d' Alene, ID (US)

(72) Inventors: Kevin Organ, Hayden, ID (US); Jeffrey Edward Fouche, Coeur d' Alene, ID (US)

(73) Assignee: Advanced Input Devices, Inc., Coeur d'Alene, ID (US)

( * ) Notice: Subject to any disclaimer, the term of this patent is extended or adjusted under 35 U.S.C. 154(b) by 88 days.

(21) Appl. No.: 14/058,671

(22) Filed: Oct. 21, 2013

(51) Int. Cl.
*G01L 1/04* (2006.01)
*G11B 5/58* (2006.01)
*F15B 13/042* (2006.01)

(52) U.S. Cl.
CPC ............... *G01L 1/04* (2013.01); *F15B 13/0424* (2013.01); *G11B 5/58* (2013.01)

(58) Field of Classification Search
CPC ........ G11B 5/58; G11B 5/455; G11B 5/4826; G11B 5/56; F15B 13/0424; G05G 9/047
USPC .............................. 73/760, 862.637–862.639
See application file for complete search history.

(56) References Cited

U.S. PATENT DOCUMENTS

| | | | |
|---|---|---|---|
| 4,488,017 A | 12/1984 | Lee | |
| 4,531,080 A * | 7/1985 | Nordstrom et al. | 318/628 |
| 5,619,195 A | 4/1997 | Allen | |
| 5,675,359 A * | 10/1997 | Anderson | 345/161 |
| 6,105,438 A * | 8/2000 | Gieseke | 73/862.042 |
| 6,189,401 B1 * | 2/2001 | Atwell et al. | 74/471 XY |
| 6,227,066 B1 * | 5/2001 | Stachniak | 74/471 XY |
| 6,747,579 B1 | 6/2004 | Ireland | |
| 6,998,815 B2 | 2/2006 | Furuki | |
| 7,136,710 B1 | 11/2006 | Hoffberg | |
| 7,164,368 B1 | 1/2007 | Ireland | |
| 7,215,320 B2 | 5/2007 | Takeuchi | |
| 7,242,988 B1 | 7/2007 | Hoffberg | |
| 7,409,879 B2 | 8/2008 | Glatz | |
| 7,474,296 B2 | 1/2009 | Obermeyer | |
| 7,623,116 B1 | 11/2009 | Bidiville | |
| 7,743,672 B2 | 6/2010 | Kurtz | |
| 7,786,368 B2 | 8/2010 | Muramatsu | |
| 7,880,594 B2 | 2/2011 | Breed | |
| 7,938,773 B2 | 5/2011 | Kawai | |
| 7,981,028 B2 | 7/2011 | Kawai | |
| 2002/0088268 A1 * | 7/2002 | Parker | 73/1.15 |
| 2004/0187593 A1 * | 9/2004 | Okada | 73/780 |

(Continued)

*Primary Examiner* — Max Noori
(74) *Attorney, Agent, or Firm* — Christensen O'Connor Johnson Kindness PLLC

(57) ABSTRACT

A force sensing multi-axis gimbaled device includes a multi-axis movement assembly having an outer pivot plate having an opening, a middle pivot plate having an opening, the middle pivot plate pivotally received within the opening in the outer pivot plate, and an inner pivot plate that is pivotally received within the opening in the middle pivot plate. A biasing assembly is in communication with the multi-axis movement assembly, which is configured to impose a first force on the multi-axis movement assembly when the multi-axis movement assembly is pivoted about a first axis. The biasing assembly is configured to impose a second force on the multi-axis movement assembly when the multi-axis movement assembly is pivoted about a second axis substantially transverse to the first axis, and the biasing assembly configured to impose a third force on the multi-axis movement assembly when the multi-axis movement assembly is pivoted about a third axis.

22 Claims, 21 Drawing Sheets

(56) References Cited

U.S. PATENT DOCUMENTS

2008/0060186 A1* 3/2008 Herdendorf et al. ....... 29/603.03
2009/0244786 A1* 10/2009 Hatch ..................... 360/294.4
2014/0125471 A1* 5/2014 Organ et al. ............... 340/407.2

* cited by examiner

FORCE SENSING MULTI-AXIS GIMBALED DEVICE

BACKGROUND

Prior art joysticks assemblies, position controllers and the like (collectively "joysticks") are widely used to control computers and machinery. Joysticks may use a variety of different sensor technologies, which may dictate the design of the joystick.

For instance, a common type of joystick employs Hall-effect sensors and magnets. In order to detect motion along the x- and y-axes, as well as intermediate axes, a plurality of sensors and magnets are typically required. The joystick design typically employs U-shaped arms operably connected to the joystick shaft. The arms or shaft are spring-loaded, and the joystick controller outputs signals based on the relative movement between the magnets and one or more of the sensors. To increase the durability and strength of the design, the overall size must be increased to ensure sufficient spring leverage to pull the arms (and the joystick shaft) back to its center position. Thus, there is a need for a durable, high strength joystick assembly that is low profile and compact in size.

It is sometimes desired to have the capability to control joystick shaft movement without looking at the joystick. For instance, when operating a machine, such as an MRI machine, it may be important to observe the machine and/or the patient while using the joystick. Thus, there is further a need for a joystick that provides feedback to the user to indicate directional movement of the joystick shaft without looking at the joystick.

SUMMARY

A force sensing multi-axis gimbaled device includes a multi-axis movement assembly having an outer pivot plate having an opening, a middle pivot plate having an opening, the middle pivot plate pivotally received within the opening in the outer pivot plate, and an inner pivot plate that is pivotally received within the opening in the middle pivot plate.

A biasing assembly is in communication with the multi-axis movement assembly, which is configured to impose a first force on the multi-axis movement assembly when the multi-axis movement assembly is pivoted about a first axis. The biasing assembly is configured to impose a second force on the multi-axis movement assembly when the multi-axis movement assembly is pivoted about a second axis substantially transverse to the first axis, and the biasing assembly configured to impose a third force on the multi-axis movement assembly when the multi-axis movement assembly is pivoted about a third axis.

The force sensing multi-axis gimbaled device may further include a travel limiter assembly configured to limit the actuation magnitude of the multi-axis movement assembly.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
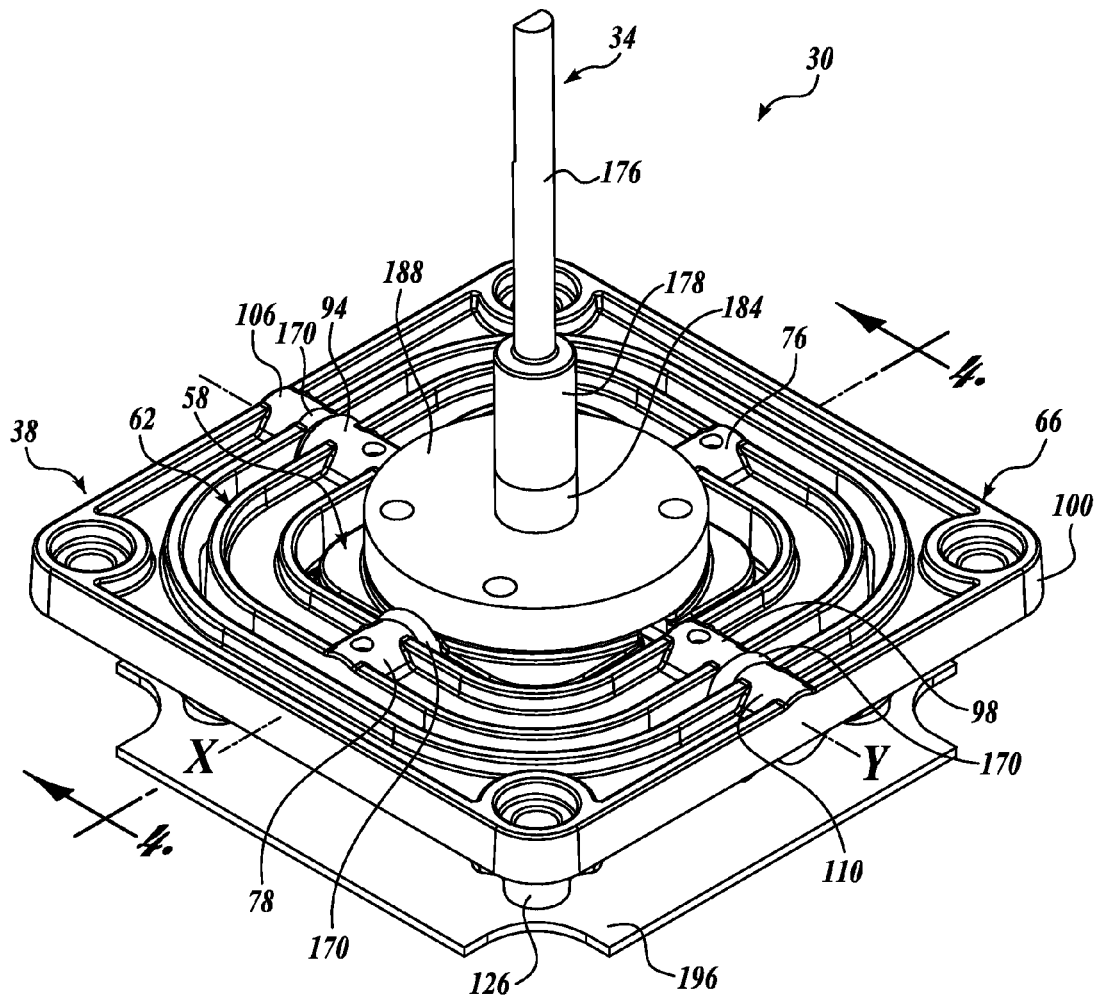
FIG. 1 is an isometric view of a force sensing multi-axis gimbaled device formed in accordance with a first exemplary embodiment of the present disclosure.

A force sensing multi-axis gimbaled device 30 formed in accordance with a first exemplary embodiment of the present disclosure may best be seen by referring to FIG. 1. The force sensing multi-axis gimbaled device 30 is embodied as a joystick suitable for use in various applications, such as machine control (e.g., controlling construction or industrial equipment, controlling medical equipment, etc.), computer or video games, computer control, robotic control, vehicles, or other suitable applications. Although the force sensing multi-axis gimbaled device 30 will be hereinafter described and illustrated as a joystick, it should be appreciated that the force sensing multi-axis gimbaled device 30 may instead be configured for use as any suitable sensor or input device. Thus, the description and illustrations provided herein should not be seen as limiting the scope of the present disclosure.

Figure 2:
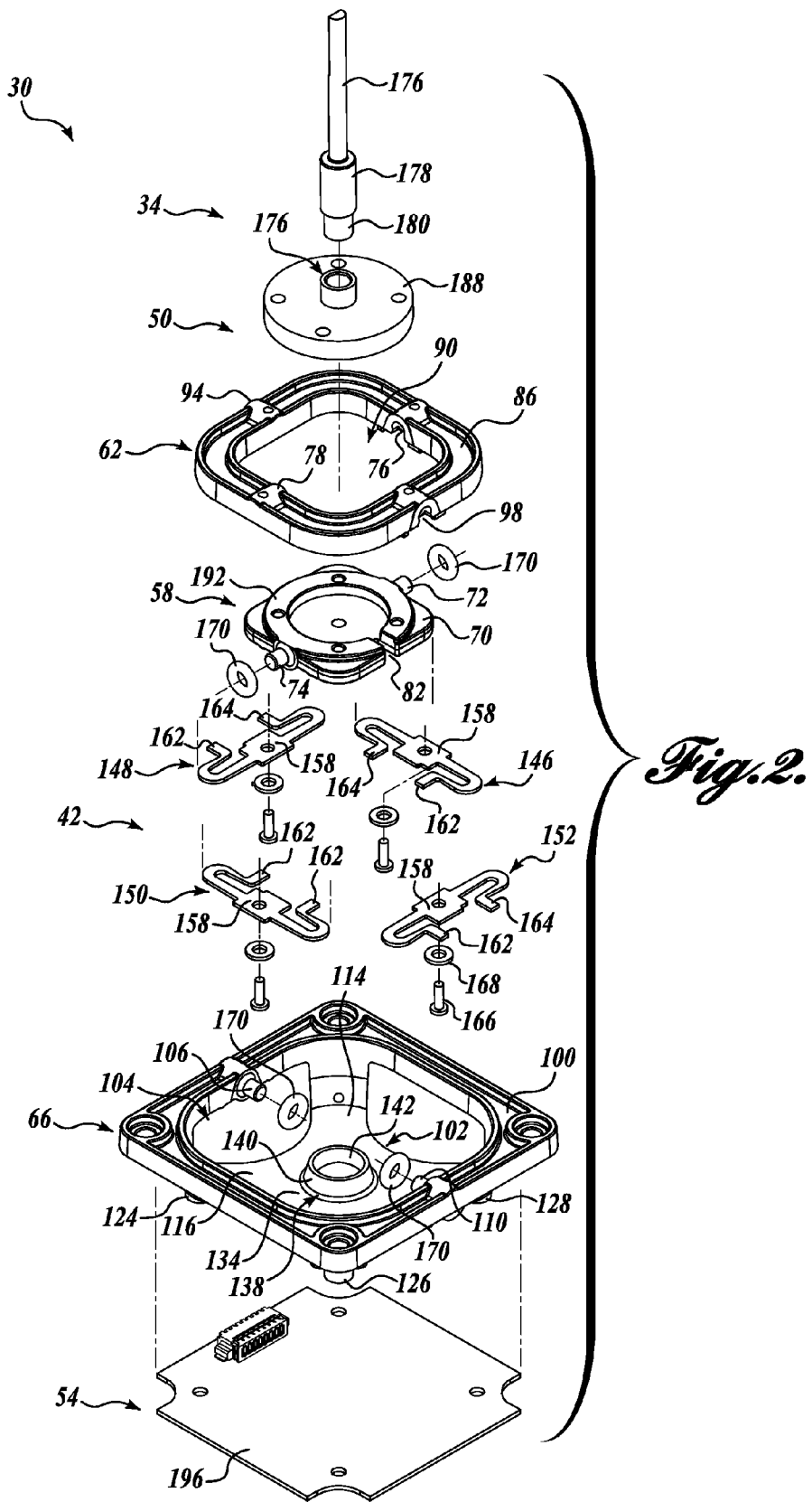
FIG. 2 is a top exploded view of the force sensing multi-axis gimbaled device of FIG. 1.
Figure 3:
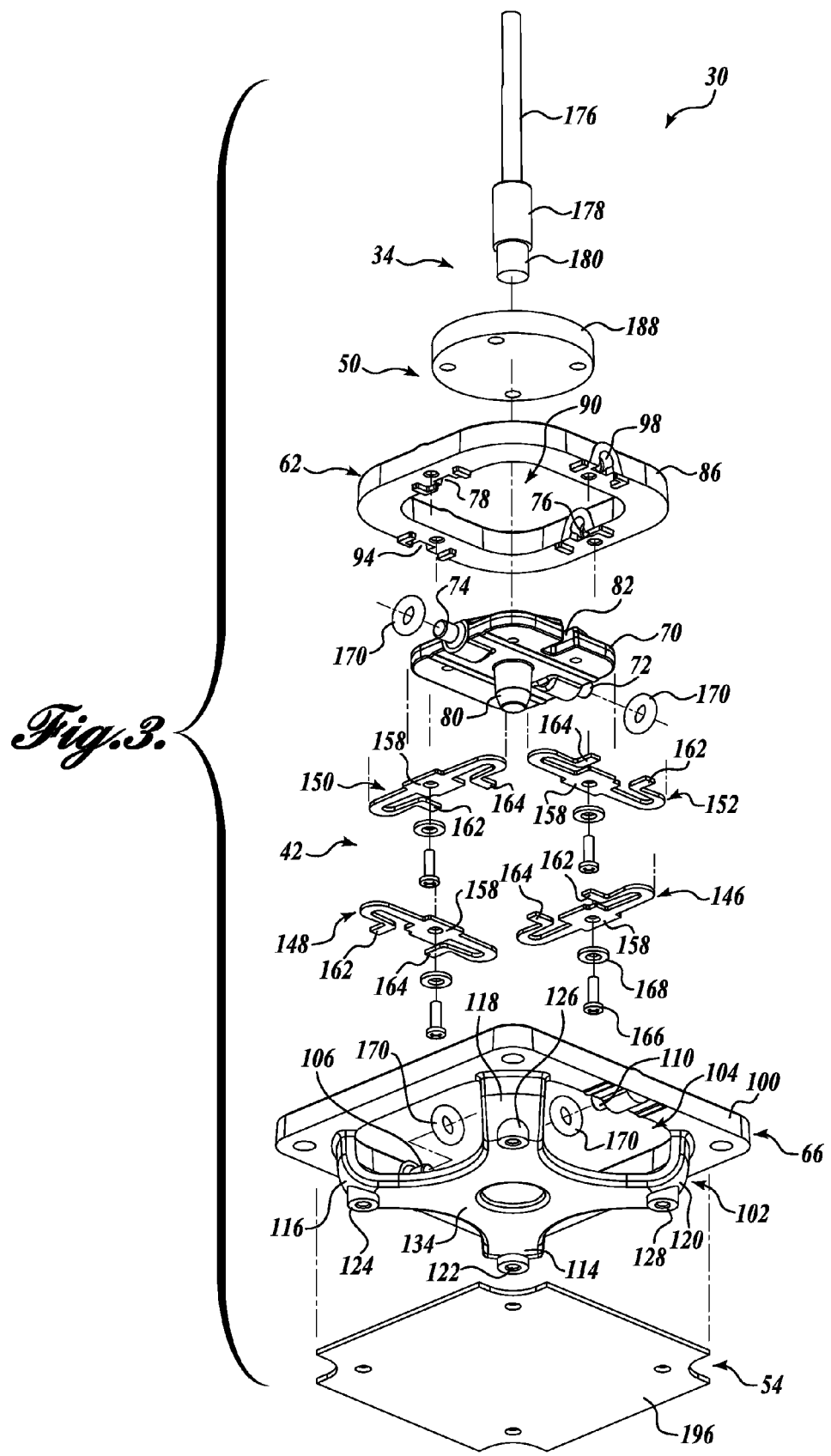
FIG. 3 is a bottom exploded view of the force sensing multi-axis gimbaled device of FIG. 1.

Referring to FIGS. 1-3, the force sensing multi-axis gimbaled device 30 includes a joystick shaft assembly 34 secured to and extending substantially vertically upwardly from a multi-axis movement assembly, or gimbaled assembly 38. The gimbaled assembly 38 allows the joystick shaft assembly 34 to move one or more axes of direction from a substantially vertical center position. In addition, and as will become apparent from the description that follows, the gimbaled assembly 38 is a low profile, scalable design that does not compromise physical strength and durability.

Referring specifically to FIGS. 2 and 3, the gimbaled assembly 38 will now be described in detail. The gimbaled assembly 38 includes a first inner pivot plate 58 pivotally secured within a second middle pivot plate 62 such that the inner pivot plate 58 is pivotal about a first axis, such as an x-axis (see FIG. 1). The middle pivot plate 62 is pivotally secured within a third outer pivot plate 66, and the middle pivot plate 62 is pivotal about a second axis substantially transverse to the first axis, such as an y-axis (see FIG. 1).

The inner pivot plate 58 includes an inner pivot plate body 70 that is of a suitable overall shape, such as square with rounded corners, as depicted, or circular, square, etc. The inner pivot plate 58 also has a suitable thickness to define an exterior circumferential surface. First and second substantially coaxially aligned pivot pins 72 and 74 extend from opposing portions of the exterior circumferential surface of the inner pivot plate body 70. The first and second pivot pins 72 and 74 are pivotally receivable within first and second substantially coaxially aligned pivot pin receptacles 76 and 78 defined within the middle pivot plate 62 to define the x-axis.

The middle pivot plate 62 includes a middle pivot plate body 86 that is substantially similar in overall shape to the inner pivot plate body 70, i.e., square with rounded corners. A center body opening 90 also similar in shape (i.e., square with rounded corners) is substantially concentrically defined in the middle pivot plate 62 for moveably receiving the inner pivot plate 58 therein.

The middle pivot plate body 86 is of a suitable thickness to define an exterior circumferential surface and an interior circumferential surface within the center body opening 90. The first and second pivot pin receptacles 76 and 78 extend inwardly from opposite portions of the interior circumferential surface of the middle pivot plate body 86. In that regard, the interior circumferential surface of the middle pivot plate body 86 is positionable adjacent to the exterior circumferential surface of the inner pivot plate body 70. As such, the inner pivot plate 58 is substantially flush with middle pivot plate 62 when the inner pivot plate 58 is pivotally secured within the middle pivot plate 62 and the joystick shaft assembly 34 is substantially centered.

As noted above, the middle pivot plate 62 is pivotally secured within the outer pivot plate 66. In that regard, the middle pivot plate 62 includes third and fourth substantially coaxially aligned pivot pin receptacles 94 and 98 defined within opposite portions of the exterior circumferential surface of the middle pivot plate body 86. The third and fourth pivot pin receptacles 94 and 98 pivotally receive third and fourth substantially coaxially aligned pivot pins 106 and 110 defined on the outer pivot plate 66 to define the y-axis.

The outer pivot plate 66 includes an outer pivot plate body defined by an upper body portion 100 and a lower body portion 102. The upper body portion 100 is substantially similar in overall shape to the inner pivot plate body 70 and the middle body plate 62, i.e., square with rounded corners. A center body opening 104 also similar in shape (i.e., square with rounded corners) is substantially concentrically defined in the upper body portion 100 for moveably receiving the middle pivot plate 62 therein. The upper body portion 100 may further include openings in each corner (not labeled) for mounting the gimbaled assembly 38 to a portion of a machine, assembly, etc., for which the force sensing multi-axis gimbaled device 30 is being used.

The upper body portion 100 is of a suitable thickness to define an exterior circumferential surface and an interior circumferential surface within the center body opening 104. The third and fourth pivot pins 106 and 110 extend inwardly from opposite portions of the interior circumferential surface of the upper body portion 100. In that regard, the interior circumferential surface of the upper body portion 100 is positionable adjacent to the exterior circumferential surface of the middle pivot plate body 86. As such, the middle pivot plate 62 is substantially flush with upper body portion 100 of the outer pivot plate 66 when the middle pivot plate 62 is pivotally secured within the outer pivot plate 66.

With the inner, middle, and outer pivot plates 58, 62, and 66 pivotally secured to one another such that they may be positioned substantially flush with one another (when the joystick shaft assembly 34 is substantially centered), it can be appreciated that the gimbaled assembly 38 is substantially low profile in design, or very thin in the "z" dimension. This is in contrast to many prior art joystick assemblies, which require a certain thickness in the "z" dimension for pivotal movement.

Moreover, the reduced "z" dimension thickness of the gimbaled assembly 38 does not require a reduction of the "x" and "y" dimensions. With the inner pivot plate 58, the middle pivot plate 62, and the upper body portion 100 of the outer pivot plates 66 each being substantially similar in shape and substantially concentrically received within each other, the gimbaled assembly 38 can be reduced in the "z" dimension without reducing the "x" and "y" dimensions. Thus, the aspect ratio between the "x" and "y" dimensions and the "z" dimension thickness of the gimbaled assembly 38 is small. As such, the gimbaled assembly 38 remains robust, and it of a size that is useable for many different systems.

The gimbaled assembly 38 is also easily scalable in design. As described above, the inner, middle, and outer pivot plates 58, 62, and 66 are all substantially similar in shape and are substantially concentrically received within one another. As such, the size of each of the inner, middle, and outer pivot plates 58, 62, and 66 could be easily increased or decreased without affecting the compatibility of the pivot plates 58, 62, and 66. Moreover, although the inner, middle, and outer pivot plates 58, 62, and 66 may be formed from any suitable method and material, they are preferably formed from injection molding. An injection molded part, as opposed to a part made from, for instance, machined components, can easily be made a different size. Thus, the gimbaled assembly 38 is easily adaptable for various design criteria.

It should also be appreciated that the inner, middle, and outer pivot plates 58, 62, and 66 may instead be pivotally secured together in another suitable manner without departing from the scope of the present disclosure. For instance, the pivot pins and pivot pin receptacles may instead be defined on the other of the inner, middle, and outer pivot plates 58, 62, and 66. As a specific example, the first and second pivot pins 72 and 74 may instead be defined on the middle pivot plate 62, and the first and second pivot pin receptacles 76 and 78 may be defined on the inner pivot plate 58. It can be appreciated that in such a configuration, the inner pivot plate 58 would still be able to pivot about the x-axis. Moreover, the location of the pivot pins and the pivot pin receptacles may be oriented within the gimbaled assembly 38 in another suitable orientation, such as by shifting the location by ninety degrees (90°). Thus, the foregoing description and illustrations provided herein should not be seen as limiting.

The combined pivotal movement of the middle pivot plate 62 about the y-axes and the inner pivot plate 58 about the x-axes enables the joystick shaft assembly 34 to effectively move about multiple axes through the gimbaled assembly 38. More specifically, referring to FIG. 9, the middle pivot plate 62 moves about the y-axes by pivoting within the outer pivot plate 66, and the inner pivot plate 58 moves about the x-axes by pivoting within the middle pivot plate 62 and about the y-axes through the middle pivot plate 62 movement. In this manner, the joystick shaft assembly 34 can move from a centered, substantially vertical position in either the x-, y-, or diagonal direction, or anywhere in between.

Although any suitable joystick shaft assembly may be used, in the illustrated embodiment, the joystick shaft assembly 34 includes an elongated shaft 176 extending upwardly from a first enlarged shaft portion 178 coaxially aligned with the elongated shaft 176. A second enlarged shaft portion 180 extends from the first enlarged shaft portion 178 opposite the elongated shaft 176. The second enlarged shaft portion 180 is smaller in diameter than the first enlarged shaft portion 178 and is coaxially aligned therewith.

The second enlarged shaft portion 180 is receivable within a shaft receptacle 184 of a sensor base 188. The sensor base 188 is securable to a sensor base mounting portion 192 defined on a top surface of the inner pivot plate 58. As such, the elongated shaft 176 of the joystick shaft assembly 34 moves the inner pivot plate 58 of the gimbaled assembly 38 in one or more axes of direction.

The pivotal movement of the gimbaled assembly 38 allows the joystick assembly 34 to travel in an arc-like manner in one or more axes of direction from its substantially vertical center position. The traveled arc length or actuation magnitude of the joystick assembly 34 may be limited by a travel limiter assembly 40 defined between the inner pivot plate 58 and the lower body portion 102 of the outer pivot plate 66. In that regard, the lower body portion 102 will first be described in detail.

The lower body portion 102 is defined by first, second, third, and fourth curved lower body arms 114, 116, 118, and 120 extending downwardly from the upper body portion 100 at each corner. The lower body arms 114, 116, 118, and 120 connect together at their lower ends to define a substantially horizontal center bottom portion 134, which defines a bottom interior surface of the lower body portion 102.

First, second, third, and fourth mounting protrusions 122, 124, 126, and 128 may be defined on the bottom surface of each of the first, second, third, and fourth lower body arms 114, 116, 118, and 120 for mounting the arms to another portion of the force sensing multi-axis gimbaled device 30, such as a control assembly 54. It should be appreciated that the lower body portion 102 of the outer pivot plate 66 may instead be any other suitable shape or configuration. For instance, rather than including first, second, third, and fourth curved lower body arms 114, 116, 118, and 120, the lower body portion 102 may instead be defined by a unitary sidewall construction.

Figure 4:
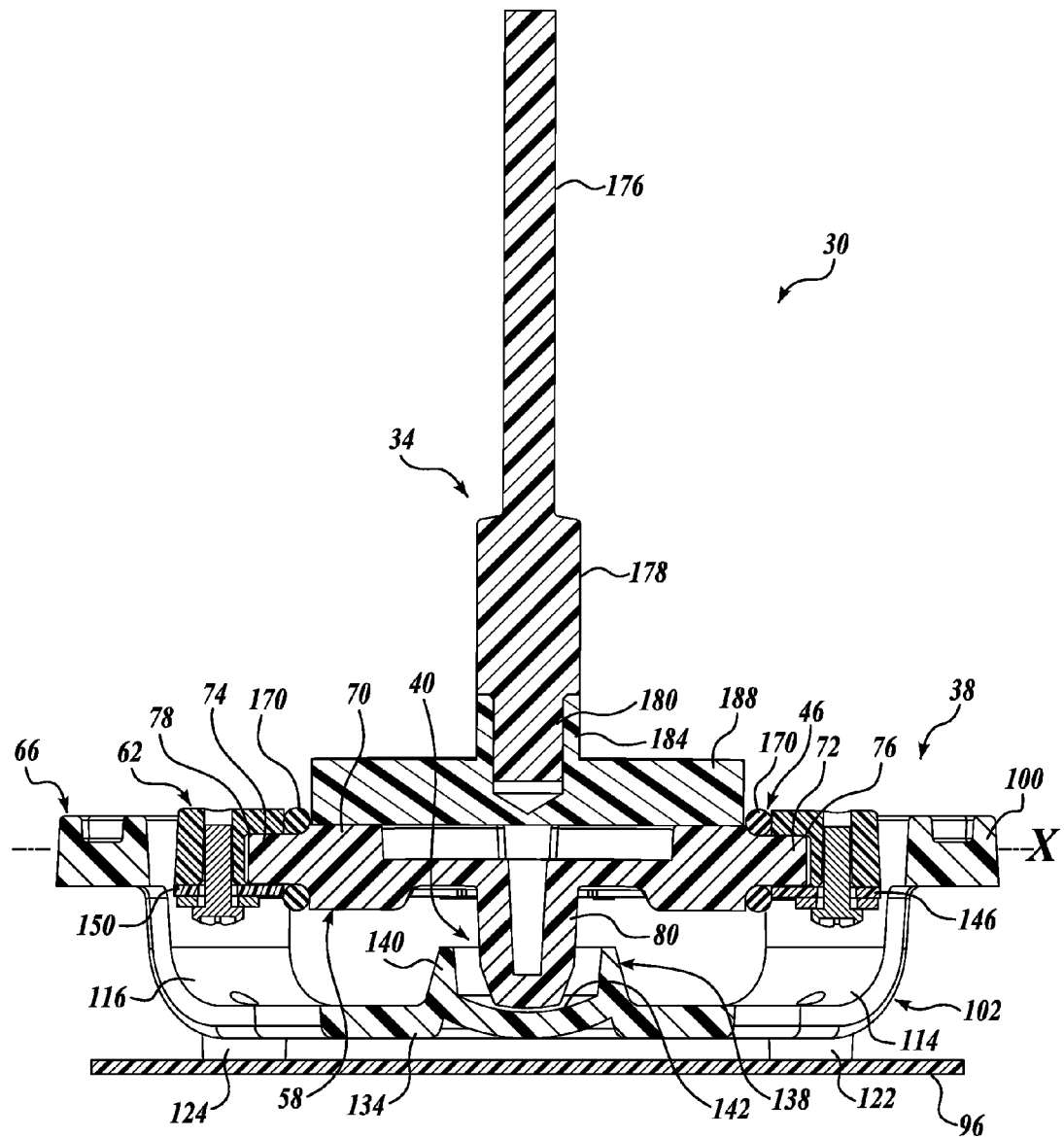
FIG. 4 is cross-sectional view of the force sensing multi-axis gimbaled device of FIG. 1, taken substantially across line 4-4.

As noted above, a travel limiter assembly 40 is defined between the lower body portion 102 of the outer pivot plate 66 and the inner pivot plate 58 to limit the traveled arc length of the joystick assembly 34. Referring additionally to FIG. 4, the travel limiter assembly 40 is defined in part by a joystick pivot pin 80 extending downwardly in a substantially transverse manner from a bottom surface of the inner pivot plate body 70. The distal end of the joystick pivot pin 80 is moveably receivable within a joystick pivot pin cup 138 formed substantially centrally within the bottom interior surface of the center bottom portion 134.

The joystick pivot pin cup 138 includes an annular cup sidewall 140 surrounding a pivot pin contoured surface 142 defined on the bottom interior of the cup 138. The annual cup sidewall 140 extends upwardly from the bottom interior surface of the center bottom portion 134 in a substantially transverse manner. The annual cup sidewall 140 is of a predetermined height to engage the joystick pivot pin 80 when the joystick assembly 34 moves in one or more axes of direction. Furthermore, the annual cup sidewall 140 defines an joystick pivot pin cup opening of a predetermined diameter to define the traveled arc length of the joystick assembly 34. In that regard, the diameter of the joystick pivot pin cup opening is decreased to decrease the traveled arc length that the joystick assembly 34, and the diameter is increased to increase the traveled arc length of the joystick assembly 34.

The contoured surface 142 of the joystick pivot pin cup 138 substantially corresponds to the arced movement of the joystick assembly 34. As such, the tip end of the joystick pivot pin 80 may be positioned to engage the contoured surface 142 such that the contoured surface 142 may help guide the joystick assembly 34 in its arced travel. In this regard, it should further be appreciated that the joystick pivot pin cup 138 may instead be any other suitable shape or contour to guide the joystick pivot pin 80 in its movement. For instance, the joystick pivot pin cup 138 may have an overall cross-shaped design to limit the movement of the joystick pivot pin 80 to the x- and y-axes. As yet another alternative, a key and paddle, or pin in slot design may be used. More specifically, the joystick pivot pin 80 could be moveably receivable within a slot defining a path of travel for the joystick pivot pin 80.

It can further be appreciated that the outer pivot plate 66 may be interchanged with another outer pivot plate having a joystick pivot pin cup 138 of a different configuration. In this manner, the travel limiter assembly 40 may be modified as needed to increase or decrease the traveled arc length of the joystick shaft assembly 34, or otherwise alter the path of travel of the joystick shaft assembly 34.

As yet another alternative, the pivot pin cup 138 could be defined within a travel limiter component separate from the outer pivot plate 66. In other words, the outer pivot plate 66 could include only the upper body portion 100, with the separate travel limiter component mateable therewith or otherwise positionable to interface with the joystick shaft assembly 34. The separate travel limiter component could be easily interchanged to modify the travel limiter assembly as needed as needed to increase or decrease the traveled arc length of the joystick shaft assembly 34, or otherwise alter the path of travel of the joystick shaft assembly 34. Thus, it should be appreciated that the travel limiter assembly 40 is adaptable to meet the design criteria of the force sensing multi-axis gimbaled device 30.

Referring again to FIGS. 2 and 3, the force sensing multi-axis gimbaled device 30 further includes a biasing assembly 42 that biases the movement of the joystick shaft assembly 34 along predefined axes and urges the joystick shaft assembly 34 toward its center position. The biasing assembly 42 is defined by first, second, third, and fourth leaf springs 146, 148, 150, and 152 secured to and engageable with a portion of the gimbaled assembly 38 as it is moved into different positions.

Each of the first, second, third, and fourth leaf springs 146, 148, 150, and 152 includes a mounting piece portion 158 that is sized and configured to be mounted to a bottom surface of the middle pivot plate 62. The mounting piece portion 158 includes an opening sized to receive a fastener, such as a screw 166, therein. The screw 166 may be passed through a washer 168, through the opening in the mounting piece portion 158, and thereafter through an opening in the middle pivot plate 62 to secure the leaf spring to the middle pivot plate 62.

Each of the first, second, third, and fourth leaf springs 146, 148, 150, and 152 further includes first and second tails 162 and 164 extending from the mounting piece portion 158. The first and second tails 162 and 164 extend forwardly from the mounting piece portion 158 along substantially the same plane as the mounting piece portion 158. The leaf springs are made from a suitable material, such as stainless steel, plastic, etc., so that the first and second tails 162 and 164 may moved into a deformed position relative to the mounting piece portion 158, i.e., out of substantially coplanar alignment with the mounting piece portion 158. It should be appreciated that the material of the leaf springs 146, 148, 150, and 152 may be modified or adapted to adjust the force of the springs for the intended application.

In that regard, each of the first and second tails 162 and 164 may also include a lengthened curved portion extending between the mounting piece portion 158 and the end of the first and second tails 162 and 164 to increase the flexibility of the tails. The length of the first and second tails 162 and 164 may be increased or decreased as needed to adjust the flexibility of the first and second tails 162 and 164. The spring force may also be altered by adjusting the thickness or other dimensional properties of the first and second tails 162 and 164.

Figure 5:
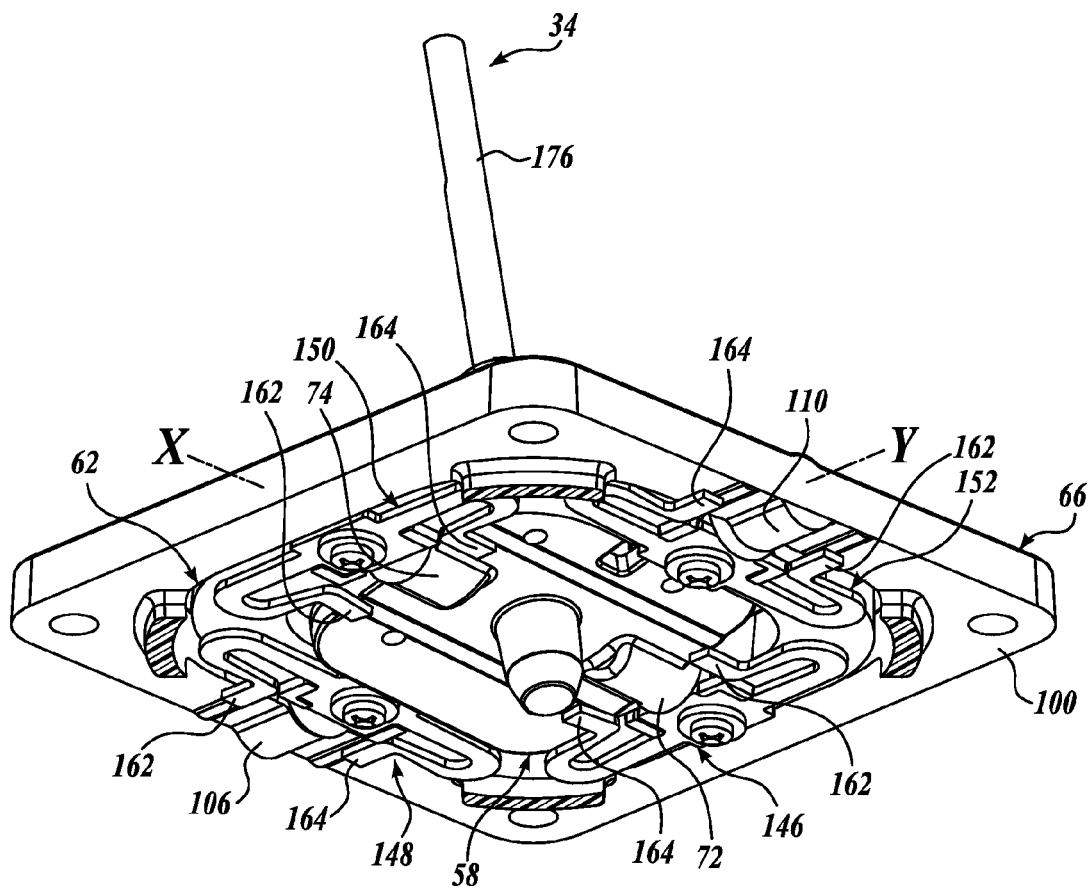
FIG. 5 is a bottom isometric view of the force sensing multi-axis gimbaled device of FIG. 1, shown in a first position.

As can be seen best by referring to FIG. 5, the first, second, third, and fourth leaf springs 146, 148, 150, and 152 are secured to the bottom surface of the middle pivot plate 62 such that the first and second tails 162 and 164 of each leaf spring are engageable with either the inner pivot plate 58 or the upper body portion 100 of the outer pivot plate 66. More specifically, the tails of the first and third leaf springs 146 and 150 are configured to engage the inner pivot plate 58, and the tails of the second and fourth leaf springs 148 and 152 are configured to engage the upper body portion 100 of the outer pivot plate 66. It should be appreciated that the leaf springs 146, 148, 150, and 152 may instead be secured to the upper surface of the middle pivot plate 62 in a similar manner.

In the depicted embodiment, the first leaf spring 146 is secured to the bottom surface of the middle pivot plate 62 near the first pivot pin receptacle 76 (see also FIGS. 2 and 3). The first leaf spring 146 is configured so that its first and second tails 162 and 164 are positioned to engage the bottom surface of the inner pivot plate 58. Similarly, the third leaf spring 150 is secured to the bottom surface of the middle pivot plate 62 near the second pivot pin receptacle 78 (see also FIGS. 2 and 3). The third leaf spring 150 is also configured so that its first and second tails 162 and 164 are positioned to engage the bottom surface of the inner pivot plate 58.

When the inner pivot plate 58 pivots with respect to the middle pivot plate 62, the inner pivot plate 58 engages one of the first or second tails 162 or 164 of both of the first and third leaf springs 146 and 150. For instance, referring to FIG. 5, the inner pivot plate 58 is shown pivoting about the x-axis in a first direction with respect to the middle pivot plate 62. The bottom surface of the inner pivot plate 58 is engaging and deforming the second tail 164 of the first leaf spring 146 and the first tail 162 of the third leaf spring 150.

With the force of the joystick shaft assembly 34 stronger than the biasing force of the second and first tails 164 and 162 of the first and third leaf springs 146 and 150, the second and first tails 164 and 162 will remain in the deformed state, as shown in FIG. 5. However, the leaf spring tails 164 and 162 bias the inner pivot plate 58 toward a non-pivoted position (and bias the joystick shaft assembly 34 toward its center position). As such, when the biasing force of the leaf spring tails 164 and 162 overcomes the force exerted on the joystick shaft assembly 34, the joystick shaft assembly 34 is biased back into its centered position.

It can be appreciated that when the inner pivot plate 58 is pivoted about the x-axis in a second direction with respect to the middle pivot plate 62, the inner pivot plate 58 will engage the first and second tails 162 and 164 of the first and third leaf springs 146 and 150. Similar to the foregoing, the first and second leaf spring tails 162 and 164 bias the inner pivot plate 58 toward a non-pivoted position (and bias the joystick shaft assembly 34 toward its center position). As such, when the biasing force of the first and second leaf spring tails 162 and 164 overcomes the force exerted on the joystick shaft assembly 34, the joystick shaft assembly 34 is biased back into its centered position.

Figure 6:
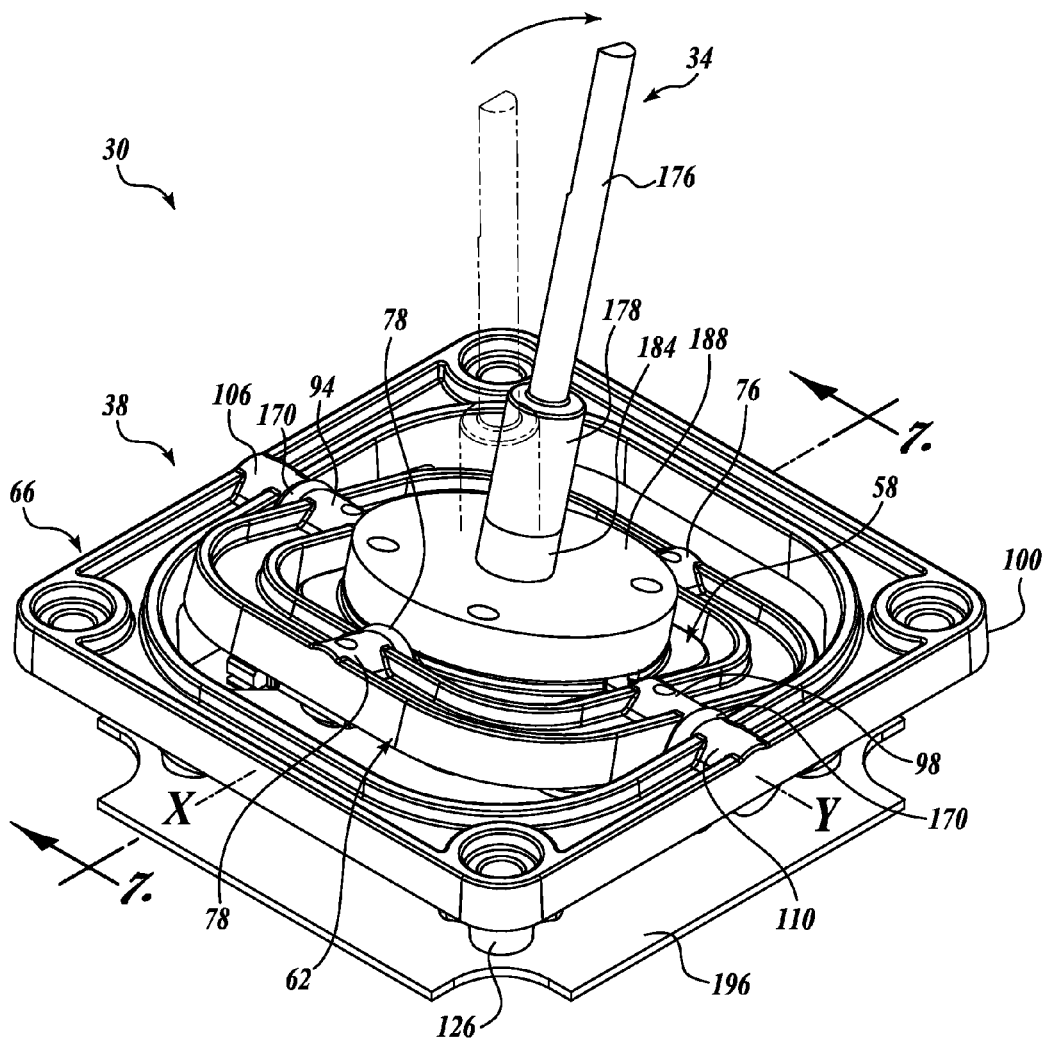
FIG. 6 is a top isometric view of the force sensing multi-axis gimbaled device of FIG. 1, shown in a second position.
Figure 7:
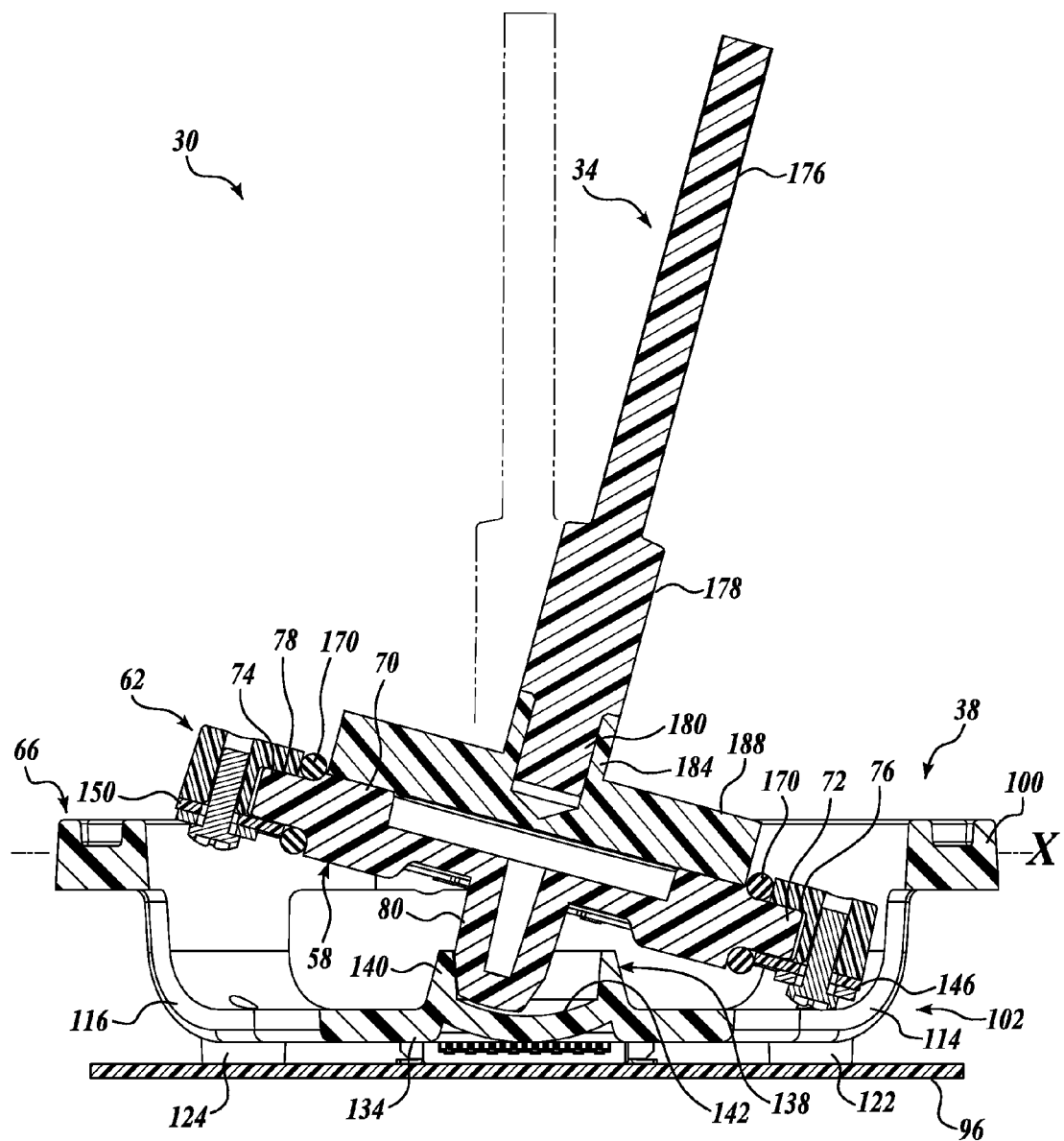
FIG. 7 is cross-sectional view of the force sensing multi-axis gimbaled device of FIG. 6 shown in the second position, taken substantially across line 7-7.
Figure 8:
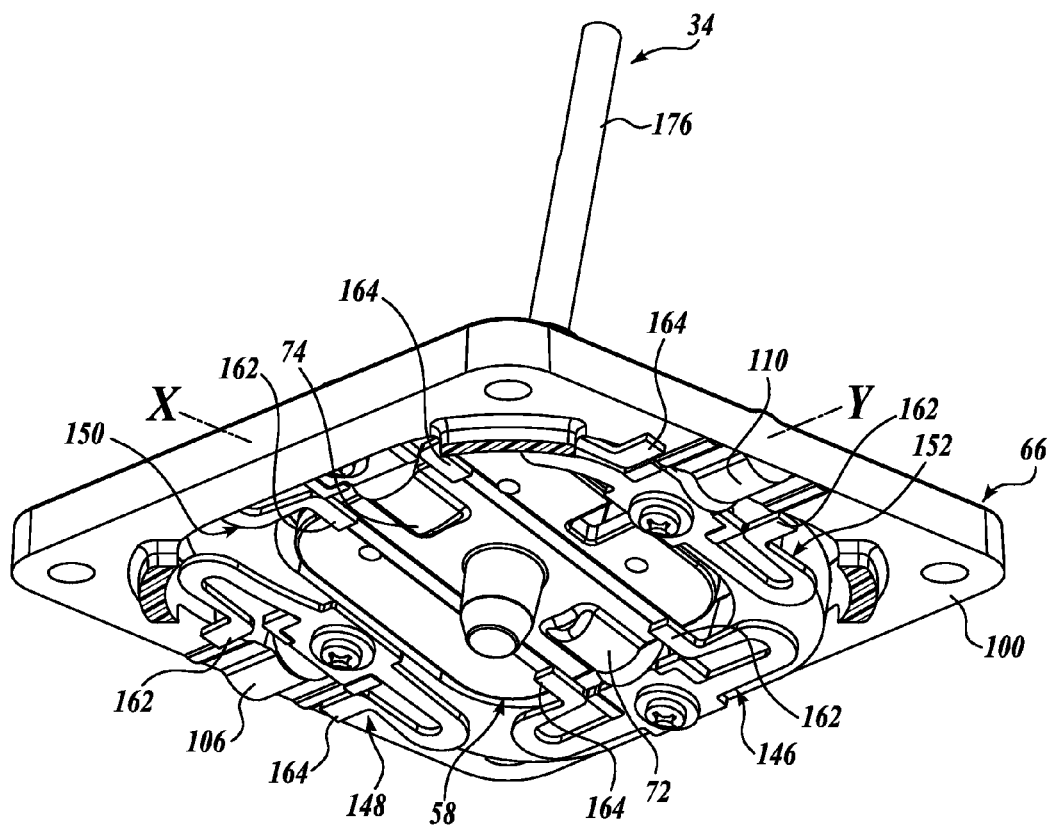
FIG. 8 is a bottom isometric view of the force sensing multi-axis gimbaled device of FIG. 6, shown in the second position.

Referring to FIGS. 6-8, the second and fourth leaf springs 148 and 152 are configured to engage the upper body portion 100 of the outer pivot plate 66, as noted above. The second leaf spring 148 is secured to the bottom surface of the middle pivot plate 62 near the third pivot pin receptacle 94 (see also FIGS. 2 and 3). The second leaf spring 148 is configured so that its first and second tails 162 and 164 are positioned to engage the bottom surface of the upper body portion 100 of the outer pivot plate 66. Similarly, the fourth leaf spring 152 is secured to the bottom surface of the middle pivot plate 62 near the fourth pivot pin receptacle 98 (see also FIGS. 2 and 3). The fourth leaf spring 152 is also configured so that its first and second tails 162 and 164 are positioned to engage the bottom surface of upper body portion 100 of the outer pivot plate 66.

When the middle pivot plate 62 pivots with respect to the outer pivot plate 66, one of the first or second tails 162 or 164 of both of the second and fourth leaf springs 148 and 152 engages the bottom surface of upper body portion 100 of the outer pivot plate 66. For instance, referring to FIG. 8, the middle pivot plate 62 is shown pivoting about the y-axis in a first direction with respect to the outer pivot plate 66. The first tail 162 of the second leaf spring 148 and the second tail 164 of the fourth leaf spring 152 are engaging and being deformed by the bottom surface of the upper body portion 100.

With the force of the joystick shaft assembly 34 stronger than the biasing force of the first and second tails 162 and 164 of the second and fourth leaf springs 148 and 152, the first and second tails 162 and 164 will remain in the deformed state, as shown in FIG. 8. However, the leaf spring tails 162 and 164 bias the middle pivot plate 62 toward a non-pivoted position (and bias the joystick shaft assembly 34 toward its center position). As such, when the biasing force of the leaf spring tails 162 and 164 overcomes the force exerted on the joystick shaft assembly 34, the joystick shaft assembly 34 is biased back into its centered positioned.

It can be appreciated that when the middle pivot plate 62 is pivoted about the y-axis in a second direction with respect to the outer pivot plate 66, the second and first tails 164 and 162 of the second and fourth leaf springs 148 and 152 will engage the bottom surface of upper body portion 100 of the outer pivot plate 66. Similar to the foregoing, the second and first leaf spring tails 164 and 162 bias the middle pivot plate 62 toward a non-pivoted position (and bias the joystick shaft assembly 34 toward its center position). As such, when the biasing force of the second and first leaf spring tails 164 and 162 overcomes the force exerted on the joystick shaft assembly 34, the joystick shaft assembly 34 is biased back into its centered positioned.

As can be appreciated from the foregoing, the tails of the first and third leaf springs 146 and 150 are configured to engage the inner pivot plate 58 when the inner pivot plate 58 pivots about the x-axis to bias the joystick assembly 34 back into its center position. Likewise, the upper body portion 100 of the outer pivot plate 66 is configured to engage the tails of the second and fourth leaf springs 148 and 152 when the middle pivot plate 62 pivots about the y-axis to bias the joystick assembly 34 back into its center position.

It should be appreciated that the biasing force of the biasing assembly 42 may be adjusted by reducing the number of leaf springs or altering the mounting configuration of the leaf springs. For instance, one of the first and third leaf springs 146 and 150 may be eliminated to reduce the biasing force when the inner pivot plate 58 pivots about the x-axis. More specifically, by eliminating one of the first and third leaf springs 146 and 150, the biasing force applied to bias the joystick assembly 34 back into its center position is reduced by about half. Similarly, one of the second and fourth leaf springs 148 and 152 may be eliminated to reduce the biasing force when the middle pivot plate 62 pivots about the y-axis.

The leaf springs may also be mounted to the gimbaled assembly 38 such that the first and second tails 162 and 164 are secured to either the inner pivot plate 58 or the upper body portion 100 of the outer pivot plate 66 such that they move with each respective plate. In this manner, when the inner pivot plate 58 or the upper body portion 100 of the outer pivot plate 66 pivots about the x- or y-axis, both the first and second tails 162 and 164 will deform either upwardly or downwardly to accommodate the movement. With both the first and second tails 162 and 164 of each leaf spring deforming, the biasing force of the biasing assembly 42 is increased. It should be appreciated that other modifications may be made to the biasing assembly 42 to adjust and/or alter the biasing force for moving the joystick shaft assembly 34 along predefined axes and urging the joystick shaft assembly 34 toward its center position.

Figure 9:
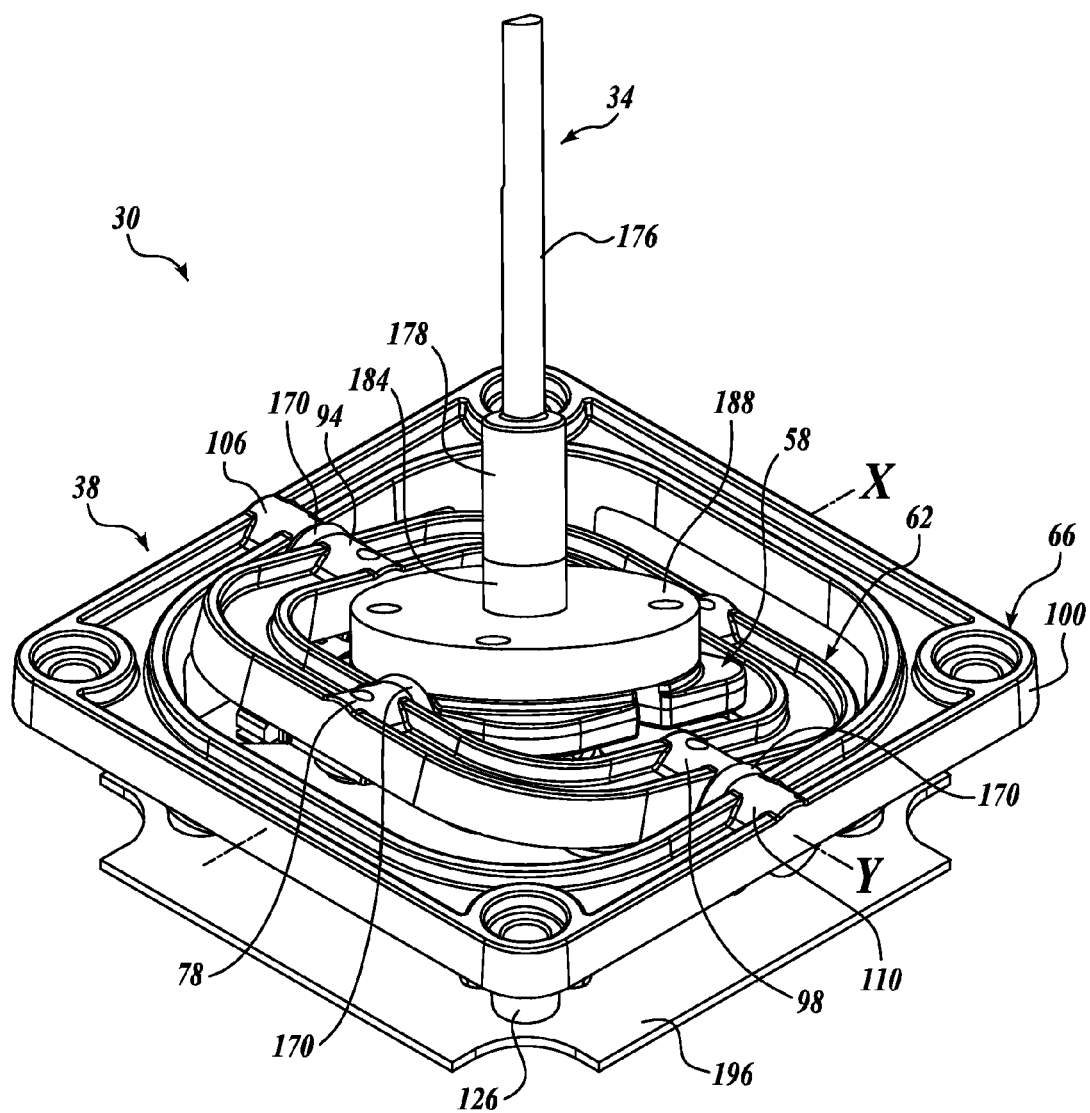
FIG. 9 is a top isometric view of the force sensing multi-axis gimbaled device of FIG. 1, shown in a third position.
Figure 10:
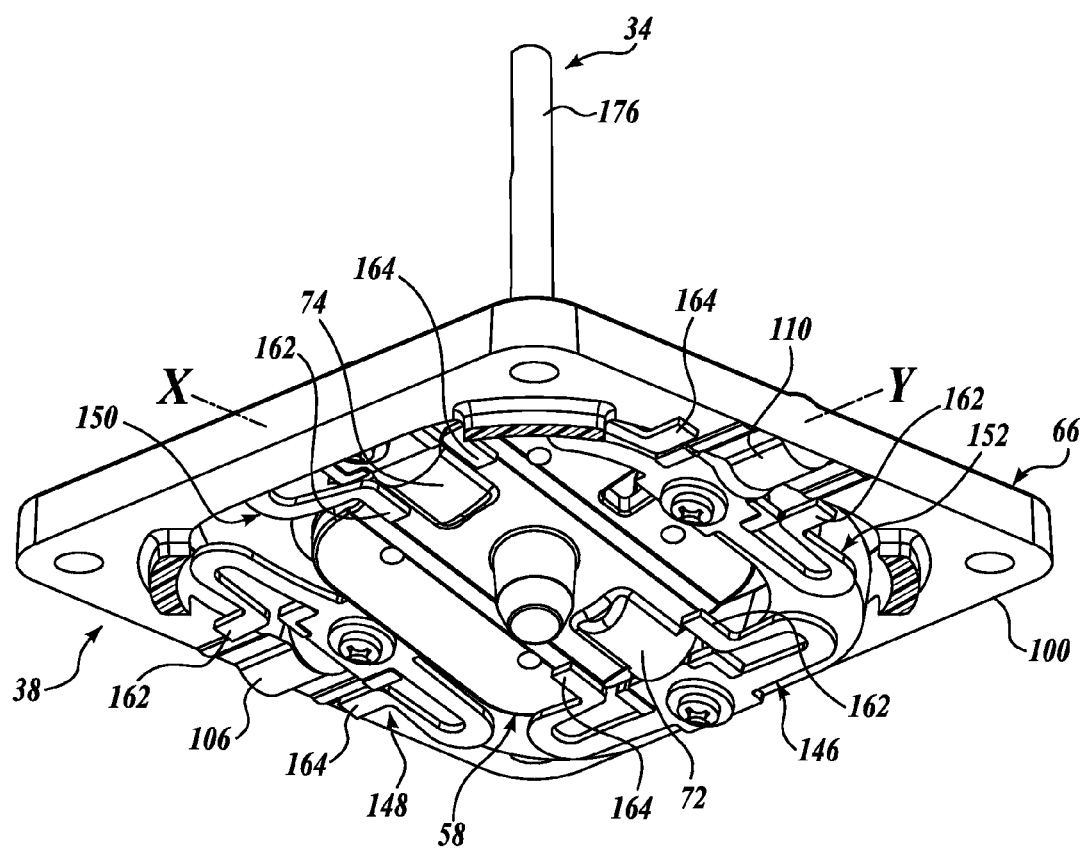
FIG. 10 is a bottom isometric view of the force sensing multi-axis gimbaled device of FIG. 9, shown in the third position.

Referring to FIGS. 9 and 10, the leaf springs are also engageable with the gimbaled assembly 38 to bias the joystick assembly 34 back into its center position when it is moved about a diagonal axes; i.e., when both the inner pivot plate 58 pivots about the x-axis and the middle pivot plate 62 pivots about the y-axis. For instance, referring specifically to FIG. 10, the inner pivot plate 58 is shown pivoting about the x-axis in a first direction with respect to the middle pivot plate 62. The bottom surface of the inner pivot plate 58 is engaging and deforming the second tail 164 of the first leaf spring 146 and the first tail 162 of the third leaf spring 150.

At the same time, the middle pivot plate 62 is shown pivoting about the y-axis in a first direction with respect to the outer pivot plate 66. The first tail 162 of the second leaf spring 148 and the second tail 164 of the fourth leaf spring 152 are engaging and being deformed by the bottom surface of the upper body portion 100.

With the force of the joystick shaft assembly 34 stronger than the biasing force of the tails of the first, second, third, and fourth leaf springs 146, 148, 150, and 152, the deformed tails will remain in the deformed state, as shown in FIG. 10. However, the deformed leaf spring tails bias the inner and middle pivot plates 58 and 62 toward a non-pivoted position (and bias the joystick shaft assembly 34 toward its center position). As such, when the biasing force of the deformed leaf spring tails overcomes the force exerted on the joystick shaft assembly 34, the joystick shaft assembly 34 is biased back into its centered positioned.

It can be appreciated that when the inner and middle pivot plates 58 and 62 are pivoted about the x- and y-axis in a different direction (to move the joystick assembly 34 about a different diagonal axes), one of the first or second tails 162 or 164 of the first, second, third, and fourth leaf springs 146, 148, 150, and 152 will be deformed by the inner and outer pivot plates 58 and 66. Thus, when the joystick assembly 34 is moved through the gimbaled assembly 38 about a diagonal axes (or along a diagonal axes), four tails are deformed to exert a biasing force on the joystick assembly 34.

In comparison, when the joystick assembly 34 is moved through the gimbaled assembly 38 about an x- or y-axes (or along the y- or x-axes), only two tails are deformed to exert a biasing force on the joystick assembly 34. Thus, it can be appreciate by one or ordinary skill in the art that movement of the joystick assembly 34 is directionally biased along one of the x- or y-axes. Less force is exerted by the biasing assembly 42 on the joystick assembly 34 when the joystick assembly 34 is moved along the x- or y-axes.

It should also be appreciated that although the biasing assembly 42 is described and illustrated as having a plurality of leaf springs, the biasing assembly 42 may instead be configured in any suitable manner. For instance, the biasing assembly 42 may instead employ the use of one or more torsion springs, extension springs, compression springs, magnets, etc., or any suitable combination thereof, to directionally bias the movement of the joystick assembly 34 along one of the x- or y-axes and/or to bias the joystick assembly 34 into its center position.

As yet another alternative, the biasing assembly 42 may be defined in part by the travel limiter assembly 40. The contoured surface 142 of the joystick pivot pin cup 138 may be sculpted to define a biased path of travel for the joystick pivot pin 80 along the x- and y-axes. For instance, a channel or groove may be defined along the x- and y-axes so that the pivot pin 80 may move along these axes without interference. However, to move in the diagonal direction, the pivot pin 80 would need to travel outside of the channel or groove, thereby engaging a portion of the contoured surface 142 and causing frictional movement of the pivot pin 80. Thus, it should be appreciated that various modifications and changes may be made without departing from the scope of the present disclosure.

Returning to FIGS. 2 and 3, the force sensing multi-axis gimbaled device 30 further includes a dampening assembly 46 that helps prevent the joystick assembly 34 from overshooting and vibrating about the center position when moving back into the center position. The dampening assembly 46 includes a plurality of dampening elements, such as O-rings 170, disposed between the pivot plates 58, 62, and 66 at each of the pivot joints.

More specifically, O-rings 170 are secured on the first and second pivot pins 72 and 74 of the inner pivot plate 58. In this manner, the O-rings 170 are disposed between the inner and middle pivot plates 58 and 62 when the first and second pivot pins 72 and 74 are pivotally received within the first and second pivot pin receptacles 76 and 78 of the middle pivot plate 62.

Similarly, O-rings 170 are secured on the third and fourth pivot pins 106 and 110 of the outer pivot plate 66. In this manner, the O-rings 170 are disposed between the middle and outer pivot plates 62 and 66 when the third and fourth pivot pins 106 and 110 are pivotally received within the third and fourth pivot pin receptacles 94 and 98 of the middle pivot plate 62.

As can be seen by referring to FIGS. 1 and 4, the O-rings 170 are sized to be frictionally disposed between the inner, middle, and outer pivot plates 58, 62, and 66 at each of the pivot joints. More specifically, the O-rings 170 engage both a portion of the inner and middle pivot plates 58 and 62 when the first and second pivot pins 72 and 74 are pivotally received within the first and second pivot pin receptacles 76 and 78 of the middle pivot plate 62. Moreover, the O-rings 170 engage both a portion of the middle and outer pivot plates 62 and 66 when the third and fourth pivot pins 106 and 110 are pivotally received within the third and fourth pivot pin receptacles 94 and 98 of the middle pivot plate 62.

The O-rings 170 are formed from a suitable material, such as rubber, to frictionally engage the inner, middle, and outer pivot plates 58, 62, and 66 as they are moved by the joystick assembly 34. In this manner, when the joystick assembly 34 is released by the user and it is biased back to the center position by the biasing assembly 42, the friction of the O-rings 170 slows the movement of the joystick assembly 34, substantially limiting overshoot and oscillation.

It should be appreciated that any other suitable dampening devices may instead be used to define the dampening assembly 46, such as Bellville washers, rubber bands, bungee cords, damped or wrapped springs or pins, tapered or pre-loaded pins, or dynamic dampers, or any suitable combination of like devices. Thus, the description and illustrations provided herein should not be interpreted as limiting the scope of the present disclosure.

Returning to FIGS. 2 and 3, the force sensing multi-axis gimbaled device 30 includes a sensor assembly 50 for sensing and outputting a signal indicating the movement of the joystick assembly 34, and a control assembly 54 for receiving and processing the signal. The sensor assembly 50 is defined in part by the sensor base 188 of the joystick shaft assembly 34.

Components of the sensor assembly 50 for sensing the movement of the joystick shaft assembly 34 may be secured to or otherwise formed within the sensor base 188. Any suitable components for sensing the movement of the joystick shaft assembly 34 may be used, such as Force Sensing Resistors (FSR). However, it should be appreciated that the sensor assembly 50 may employ any suitable technology without departing from the sprit and scope of the present disclosure, such as, for example, GMR/IMR/Hall magnetic sensors, optical encoders, two dimensional (2D) optical plates, inclinometers, accelerometers, resistive potentiometers, discrete switches (for digital output), magnetic sensors, etc. Thus, it should be appreciated that the force sensing multi-axis gimbaled device 30 is not limited in design to any particular sensor technology.

The control assembly 54 is defined in part by a printed circuit board (PCB) 96 positionable horizontally beneath and securable to the outer pivot plate 66. In that regard, the PCB 96 does not add significant height (in the z-axis dimension) to the force sensing multi-axis gimbaled device 30.

The PCB 96 is also configurable to include appropriate electrical components (not shown) for receiving and processing the outputted sensor signal from the sensor assembly 50. The PCB 96 may be substantially free of electrical components so that it is interchangeable and configurable depending on the type of sensor technology used.

The force sensing multi-axis gimbaled device 30 may further include a center push button assembly (not shown) for engaging a switch, button, etc., positioned within the gimbaled assembly 38. For instance, a switch, button, etc., may be positioned beneath the inner and middle pivot plates 58 and 62 that it is engageable by a portion of the inner pivot plate 58 when the joystick assembly 34 is depressed substantially vertically. The first and second tails 162 and 164 of the first and third leaf springs 146 and 150 bias the inner pivot plate 58 out of engagement with the switch, button, etc. As such, the switch, button, etc., is not engaged when the joystick assembly 34 is pivoting through the gimbaled assembly 34 or when the joystick assembly 34 is not being pressed down.

Figure 11:
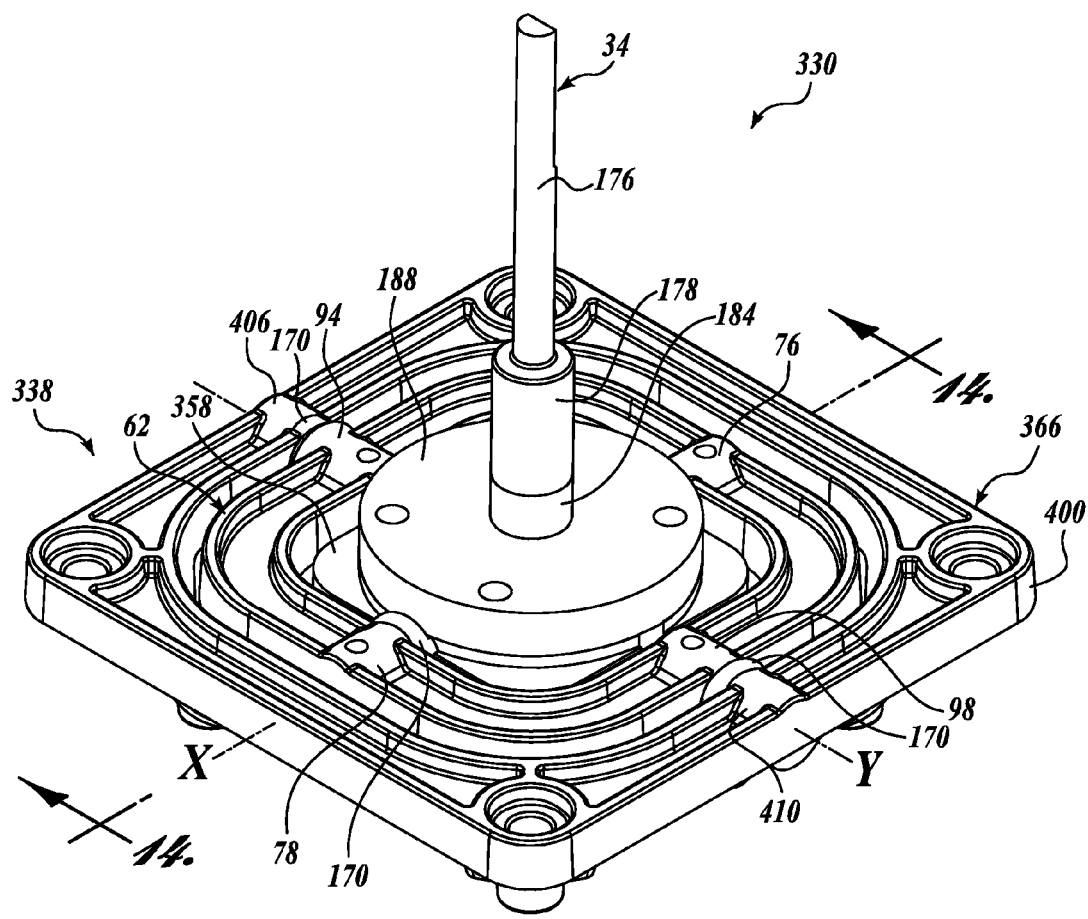
FIG. 11 is an isometric view of a force sensing multi-axis gimbaled device formed in accordance with a second exemplary embodiment of the present disclosure.
Figure 12:
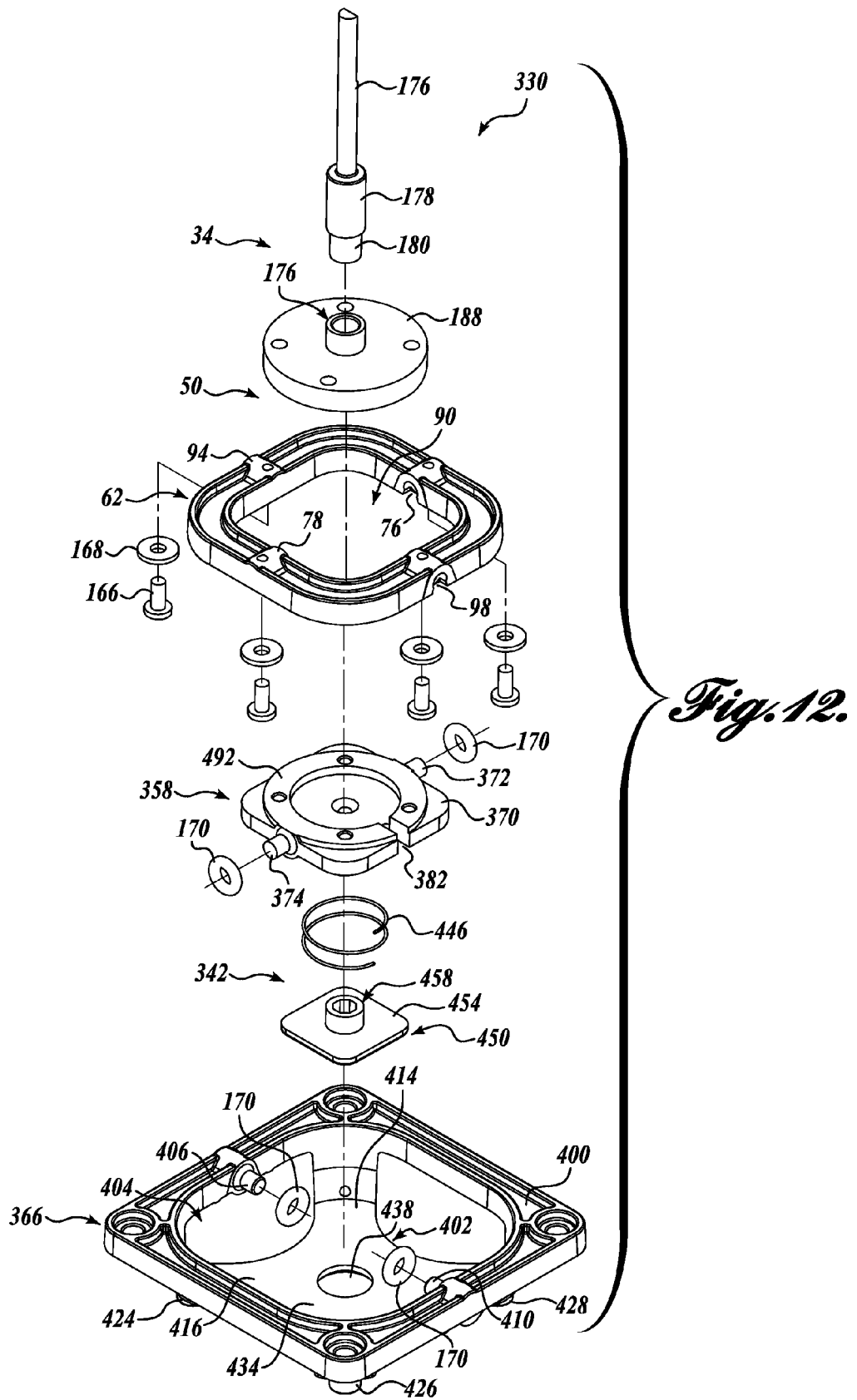
FIG. 12 is a top exploded view of the force sensing multi-axis gimbaled device of FIG. 11.
Figure 13:
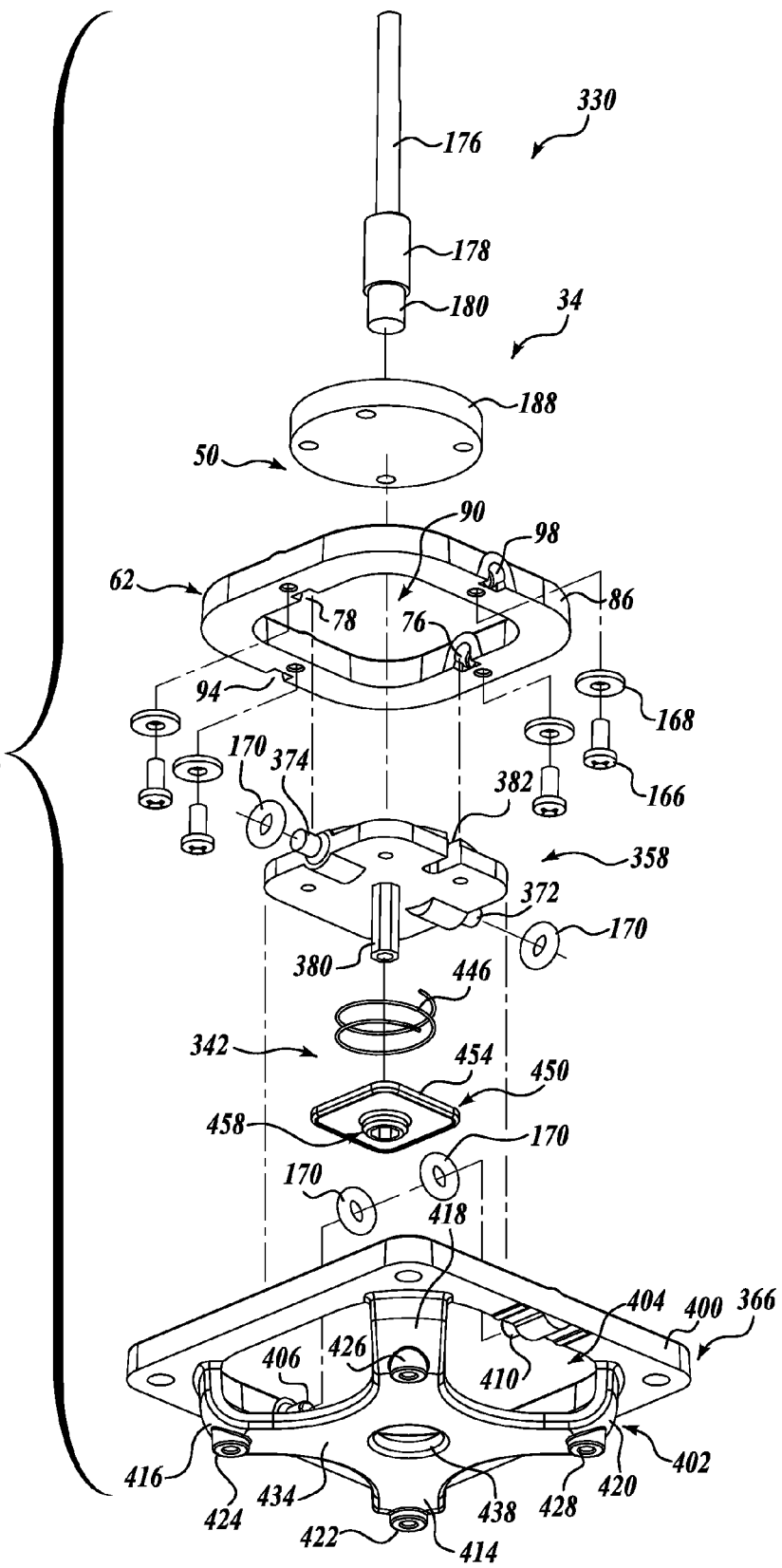
FIG. 13 is a bottom exploded view of the force sensing multi-axis gimbaled device of FIG. 11.

Referring to FIGS. 11-13, a second exemplary embodiment of a force sensing multi-axis gimbaled device 330 will now be described. The force sensing multi-axis gimbaled device 330 is substantially similar to the force sensing multi-axis gimbaled device 30 described above except for the differences hereinafter provided. In that regard, identical reference numerals used to describe and illustrate components of the force sensing multi-axis gimbaled device 30 have been used for description and illustration of the force sensing multi-axis gimbaled device 330 where the components are identical. Moreover, similar components have been labeled in the '300 or '400 series for ease of reference.

Figure 14:
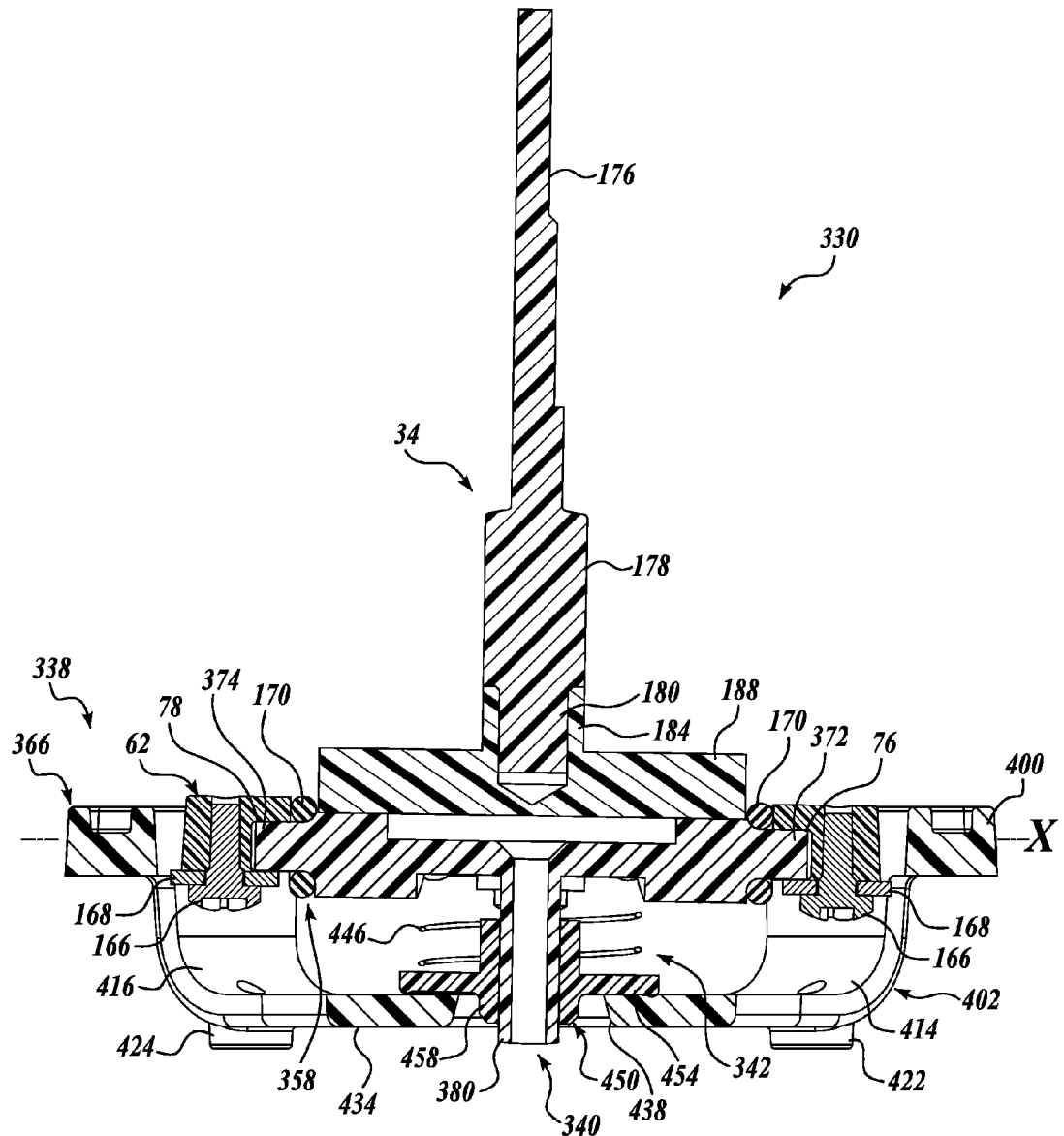
FIG. 14 is cross-sectional view of the force sensing multi-axis gimbaled device of FIG. 11, taken substantially across line 14-14.

Referring to FIGS. 12-14, the force sensing multi-axis gimbaled device 330 includes a travel limiter assembly 340 defined by a joystick pivot pin 380 extending substantially transversely downwardly from a bottom surface of the inner pivot plate 358. The joystick pivot pin 380 is moveably receivable within a pivot pin opening 438 defined within the center bottom portion 434 of the lower body portion 402 of the outer pivot plate 366.

Figure 16:
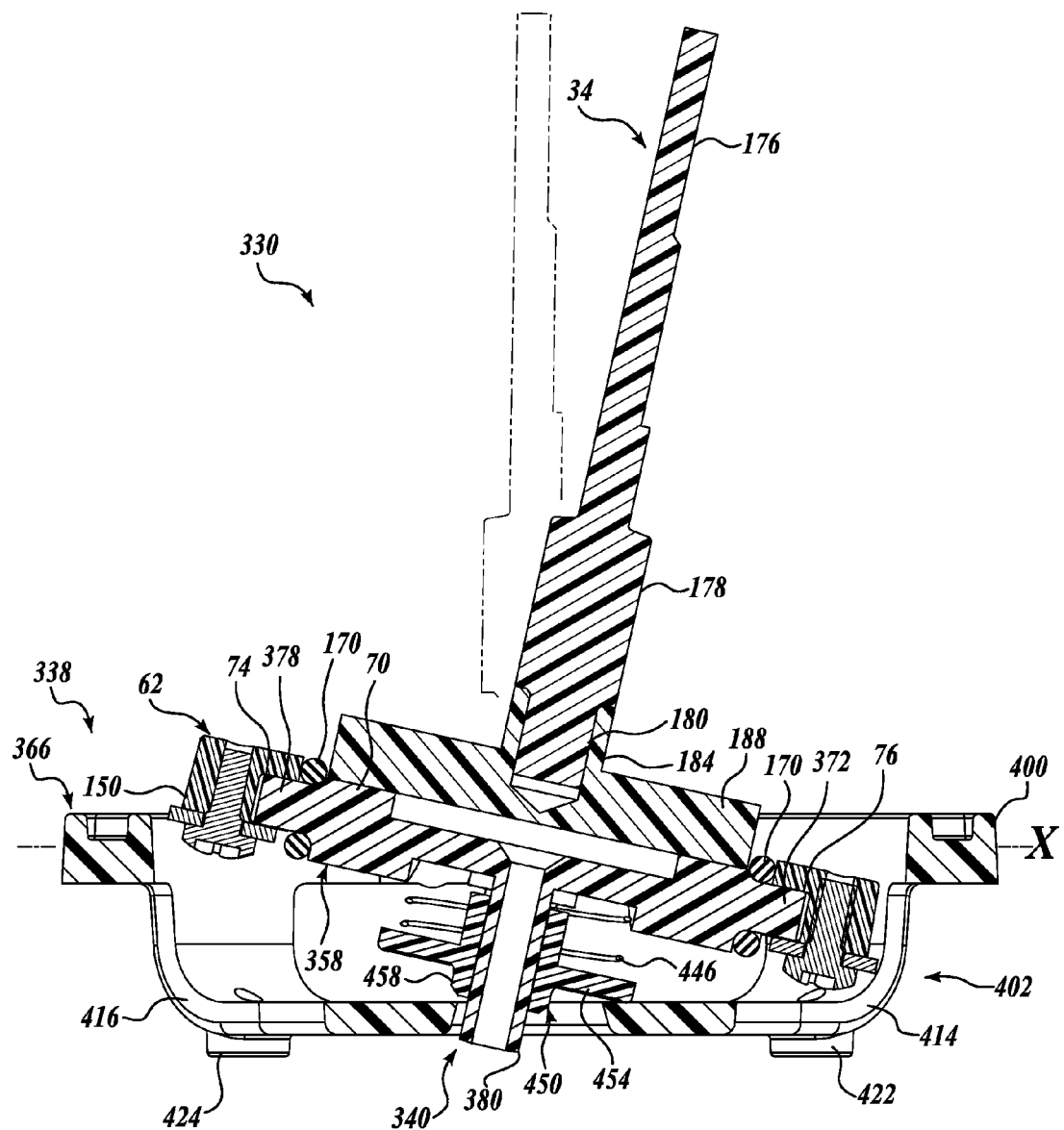
FIG. 16 is cross-sectional view of the force sensing multi-axis gimbaled device of FIG. 15 shown in the first position, taken substantially across line 16-16.

Referring additionally to FIG. 16, as the joystick assembly 34 pivots through the gimbaled assembly 338, the joystick pivot pin 380 moves within the pivot pin opening 438. The pivot pin opening 438 is of a predetermined diameter to define the traveled arc length of the joystick assembly 34. In that regard, the diameter of the pivot pin opening 438 is decreased to decrease the traveled arc length that the joystick assembly 34, and the diameter is increased to increase the traveled arc length of the joystick assembly 34.

The force sensing multi-axis gimbaled device 330 includes a biasing assembly 342 configured to bias the movement of the joystick shaft assembly 34 along the x- and y-axes and urge the joystick shaft assembly 34 toward its center position. The biasing assembly 342 is defined by a compression spring 446 and spring foot 450 that are positionable between the inner pivot plate 52 and the lower body portion 402 of the outer pivot plate 366.

The compression spring 446 is receivable on the joystick pivot pin 380 and is secured on the pivot pin 380 by the spring foot 450. In that regard, the spring foot 450 includes a spring-engaging body 454 extending radially outwardly from a pivot pin sleeve 458.

The pivot pin sleeve 458 is configured to secure the spring foot 450 onto the joystick pivot pin 380. The cross-sectional shape and size of the joystick pivot pin 380 may be substantially identical to the cross-sectional shape and size of the internal opening of the pivot pin sleeve 458. In that regard, the cross-sectional shape may be polygonal so that the joystick pivot pin 380 does not rotate within the pivot pin sleeve 458 when received therein.

The spring-engaging body 454 extends radially outwardly from the pivot pin sleeve 458 so that its upper surface is engageable with the compression spring 446 and its lower surface is engageable with the center bottom portion 434 of the lower body portion 402 of the outer pivot plate 366. In this manner, the compression spring 446 biases the spring foot 450 away from the inner pivot plate 58 to urge the joystick shaft assembly 34 toward its center position.

In the embodiment depicted in FIGS. 11-20, the spring-engaging body 454 is substantially square in shape. The square shape of the spring-engaging body 454 is configured to bias the movement of the joystick shaft assembly 34 along the x- and y-axes.

Figure 15:
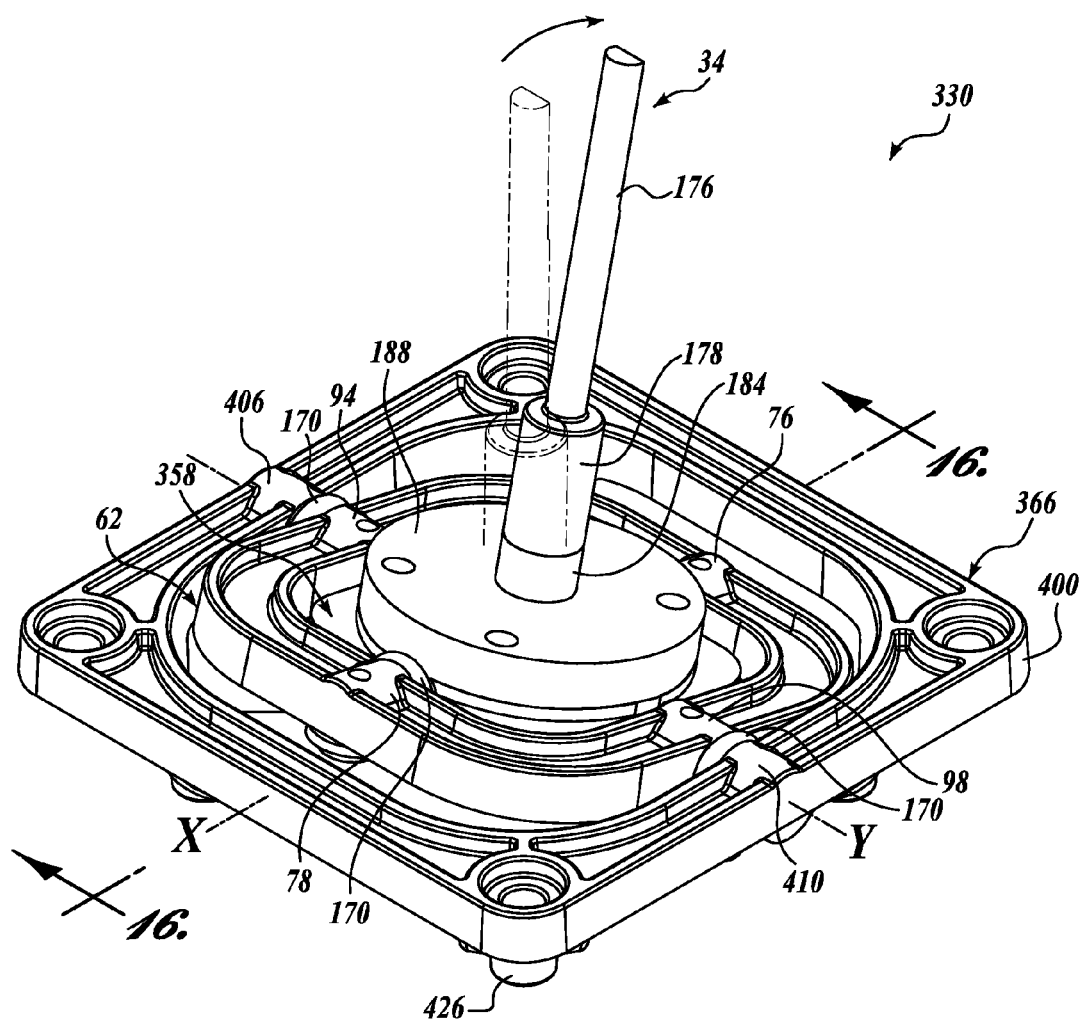
FIG. 15 is a top isometric view of the force sensing multi-axis gimbaled device of FIG. 11, shown in a first position.

More specifically, referring to FIGS. 15 and 16, the joystick assembly 34 is shown moving through the gimbaled assembly 338 about the y-axis. The spring foot 450 is positioned on the joystick pivot pin 380 such that a straight edge of the spring-engaging body 454 engages the center bottom portion 434 of the lower body portion 402 of the outer pivot plate 366. The portion of the spring-engaging body 454 near the opposite straight edge compresses the compression spring 446 upwardly. The compression spring 446 remains compressed until the stored energy in the compression spring 446 overcomes the force exerted on the joystick assembly 34. The compression spring 446 then biases the joystick assembly 34 back into its center position.

Figure 17:
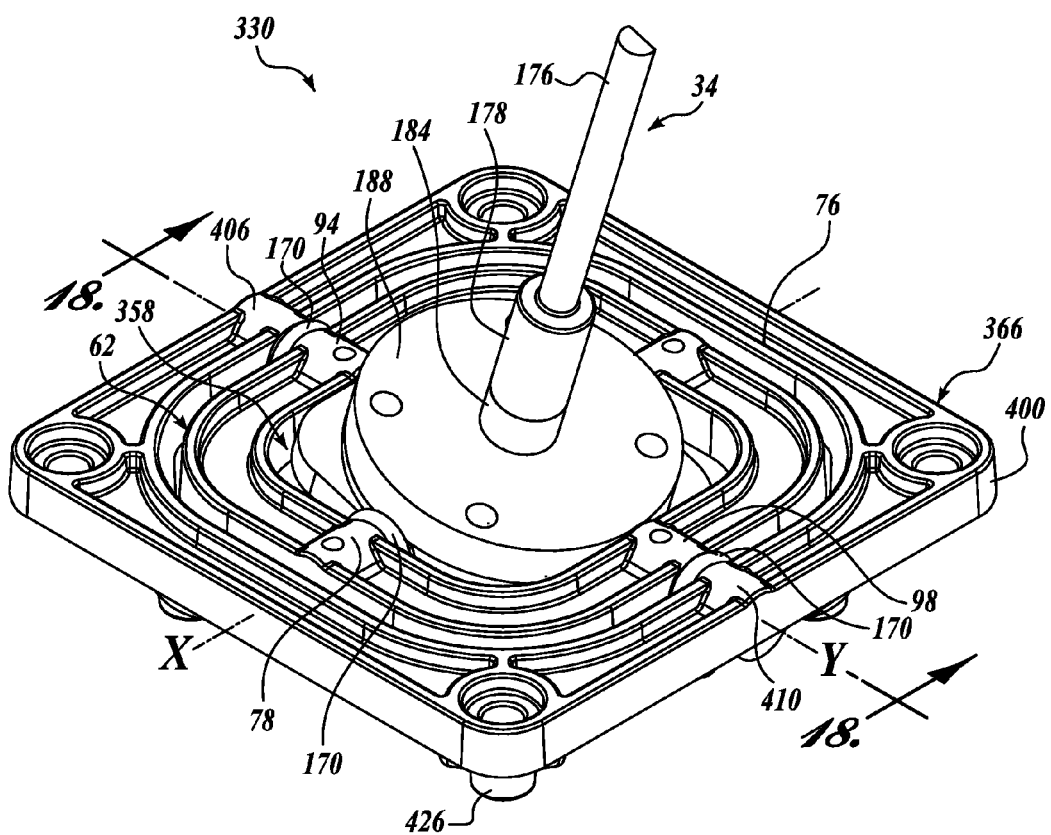
FIG. 17 is a top isometric view of the force sensing multi-axis gimbaled device of FIG. 11, shown in a second position.
Figure 18:
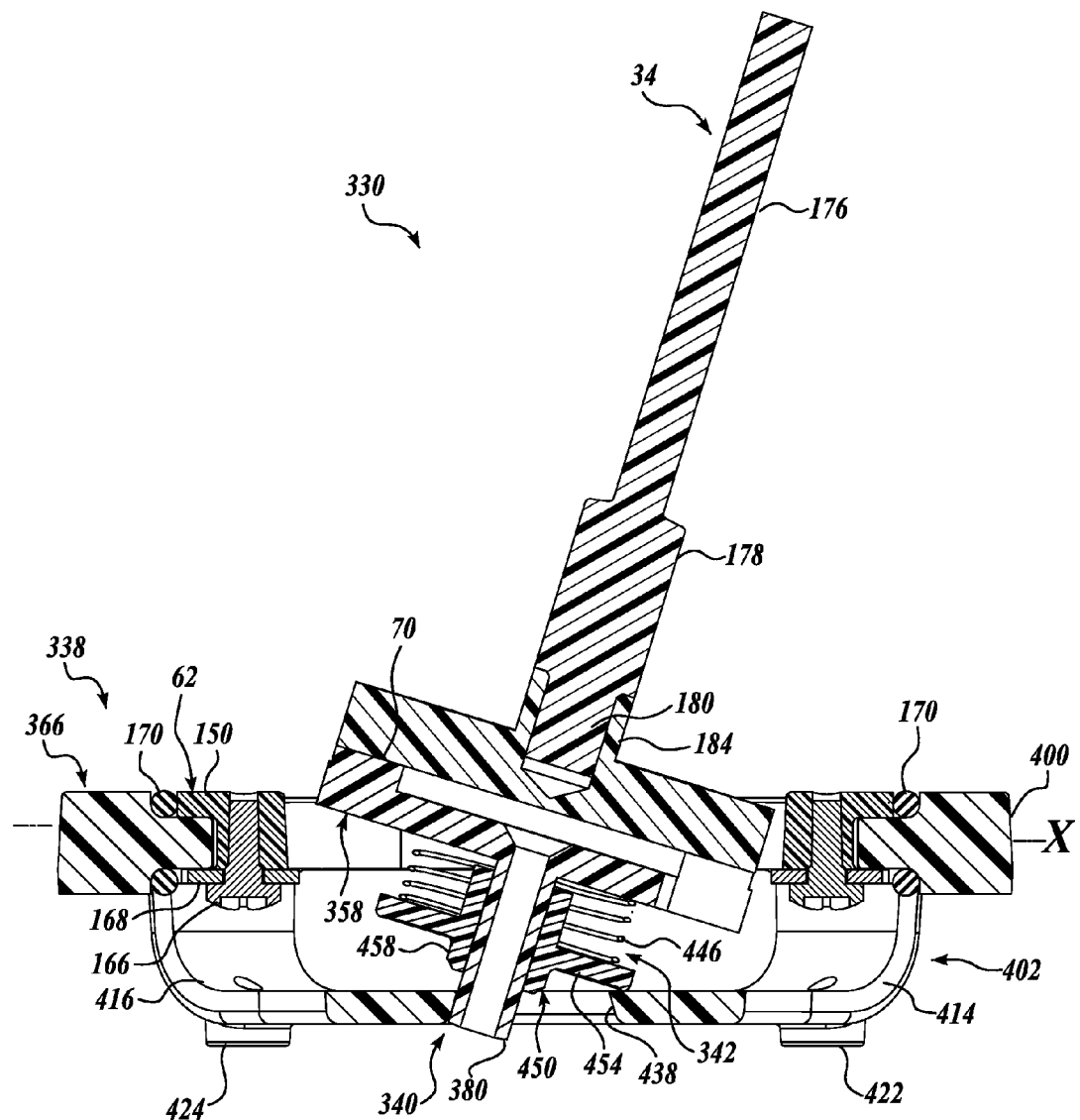
FIG. 18 is cross-sectional view of the force sensing multi-axis gimbaled device of FIG. 17 shown in the second position, taken substantially across line 18-18.

Referring to FIGS. 17 and 18, the joystick assembly 34 is shown moving through the gimbaled assembly 338 about the x-axis. As the joystick assembly 34 moves, an adjacent straight edge of the spring-engaging body 454 engages the center bottom portion 434 of the lower body portion 402 of the outer pivot plate 366. The portion of the spring-engaging body 454 near the opposite straight edge compresses the compression spring 446 upwardly. The compression spring 446 remains compressed until the stored energy in the compression spring 446 overcomes the force exerted on the joystick assembly 34. The compression spring 446 then biases the joystick assembly 34 back into its center position.

Figure 19:
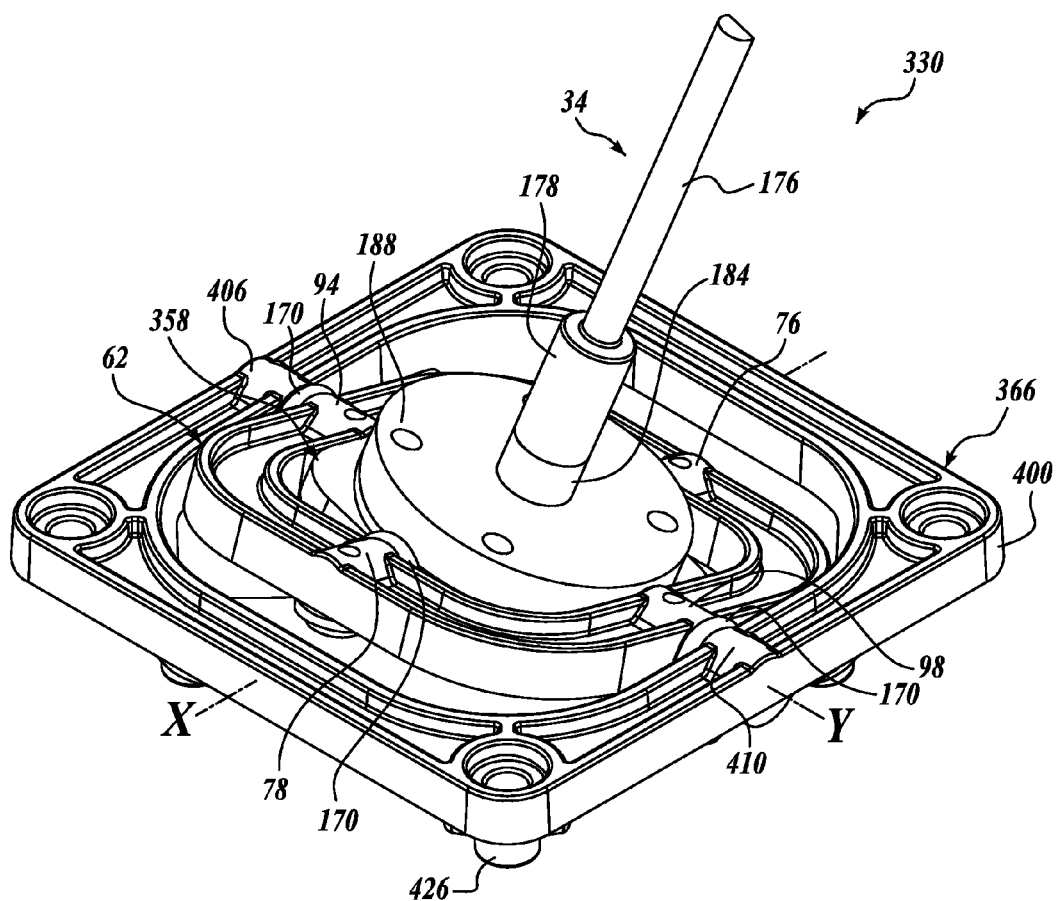
FIG. 19 is a top isometric view of the force sensing multi-axis gimbaled device of FIG. 11, shown in a third position.
Figure 20:
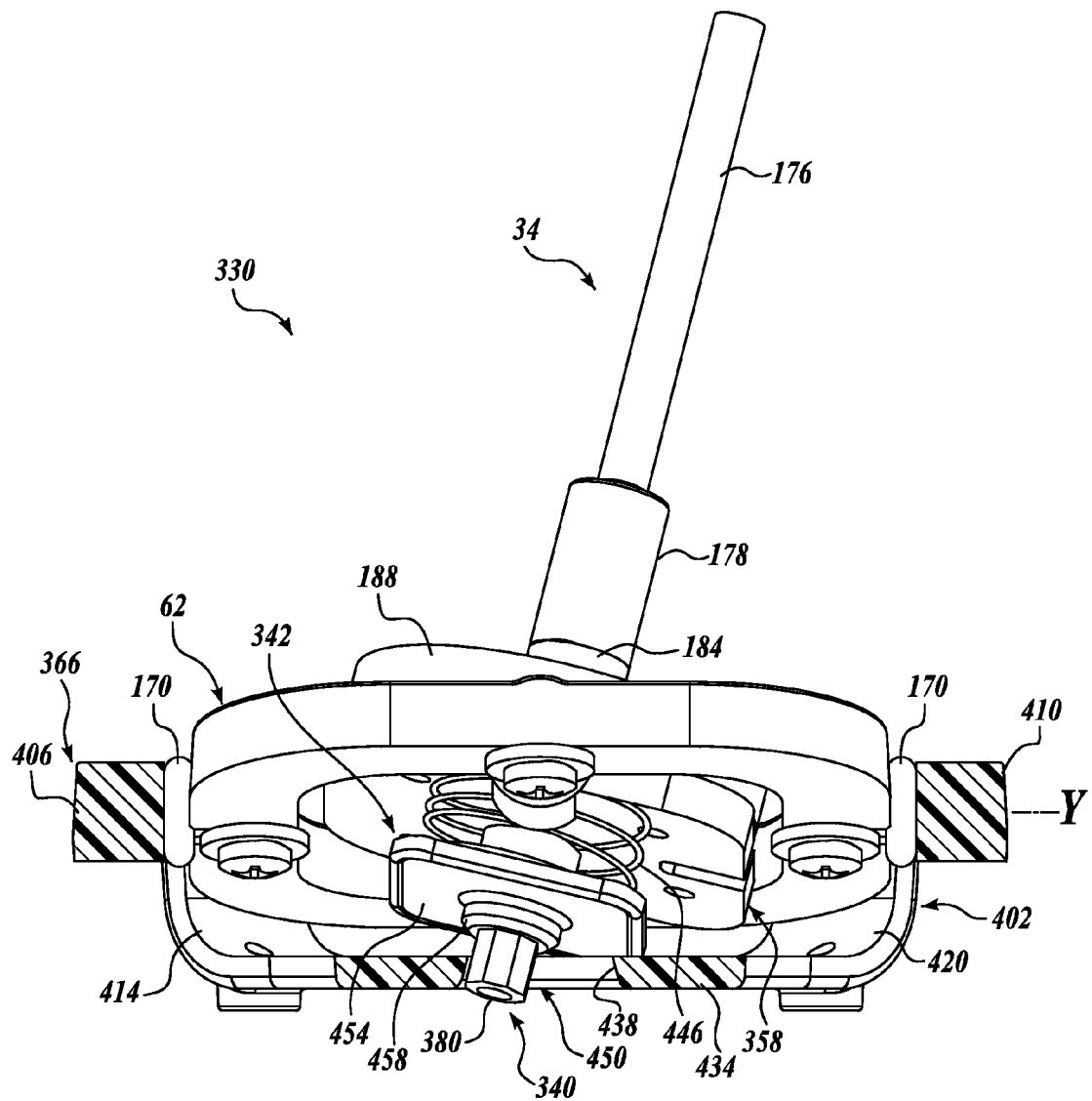
FIG. 20 is partial cross-sectional view of the force sensing multi-axis gimbaled device of FIG. 15 shown in the third position.

Referring to FIGS. 19 and 20, the joystick assembly 34 is shown moving through the gimbaled assembly 338 about a diagonal axis. A corner of the spring-engaging body 454 engages the center bottom portion 434 of the lower body portion 402 of the outer pivot plate 366. The portion of the spring-engaging body 454 near the opposite corner compresses the compression spring 446 upwardly. The compression spring 446 remains compressed until the stored energy in the compression spring 446 overcomes the force exerted on the joystick assembly 34. The compression spring 446 then biases the joystick assembly 34 back into its center position.

The corner portion of the spring-engaging body 454 exerts a larger force on the compression spring 446 than a straight-edge portion. Thus, more force must be exerted on the joystick assembly 34 to move the joystick assembly 34 along a diagonal axes (to compress the compression spring 446 with a corner portion of the spring-engaging body 454). In this regard, it can be appreciated that the square design of the spring-engaging body 454 biases the movement of the joystick shaft assembly 34 along the x- and y-axes.

Figure 21:
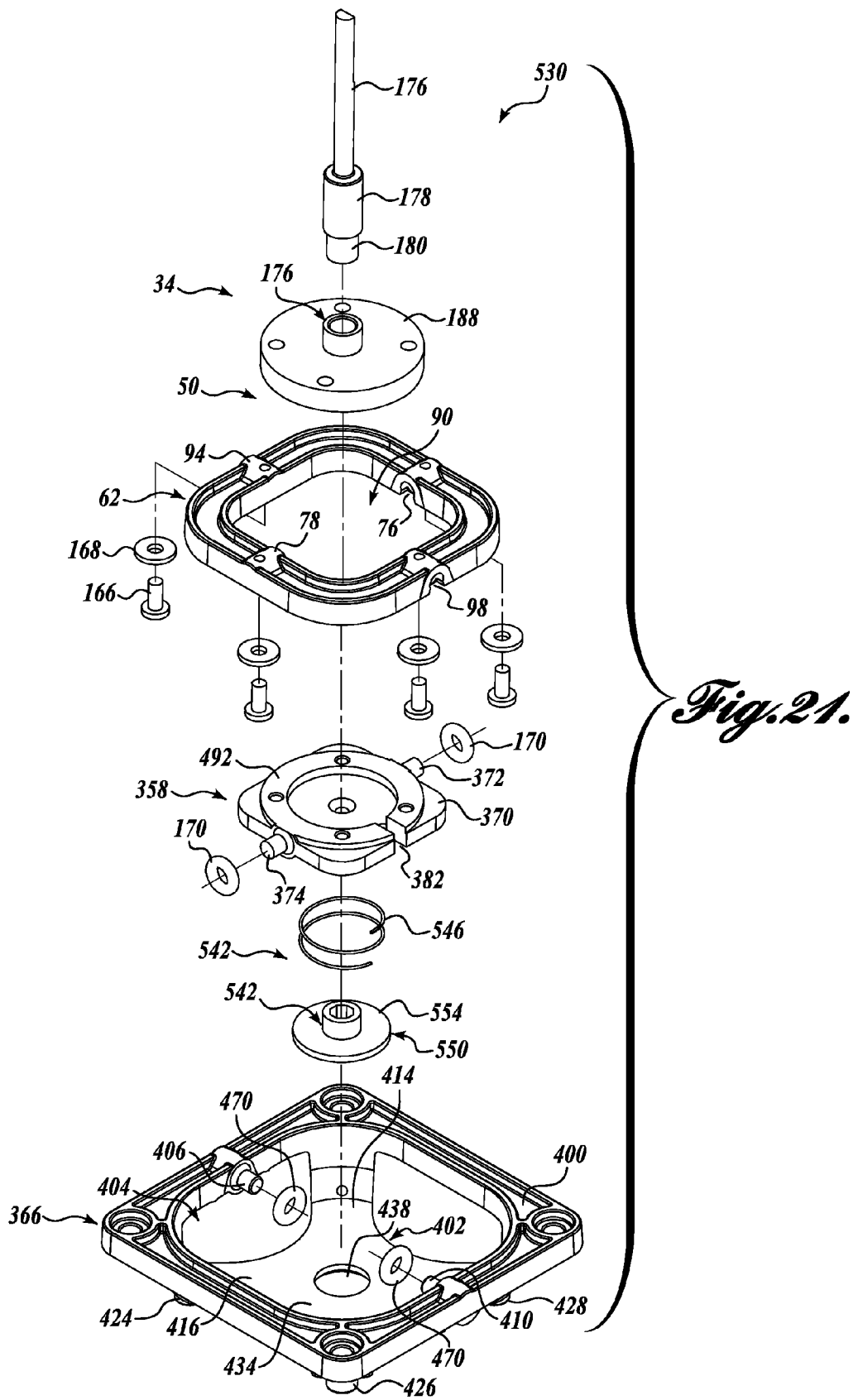
FIG. 21 is a top exploded view of a force sensing multi-axis gimbaled device formed in accordance with a third exemplary embodiment of the present disclosure.

Referring to FIG. 21, a third exemplary embodiment of a force sensing multi-axis gimbaled device 530 will now be described. The force sensing multi-axis gimbaled device 530 is substantially similar to the force sensing multi-axis gimbaled device 330 described above except for the differences hereinafter provided. In that regard, identical reference numerals used to describe and illustrate components of the force sensing multi-axis gimbaled device 330 have been used for description and illustration of the force sensing multi-axis gimbaled device 330 where the components are identical.

The force sensing multi-axis gimbaled device 530 includes a spring foot 550 having a substantially round spring-engaging body 454. In this manner, the spring foot 550 does not bias the movement of the joystick shaft assembly 34 along the x- and y-axes. Rather, the joystick shaft assembly 34 can move equally along all axes.

While illustrative embodiments have been illustrated and described, it will be appreciated that various changes can be made therein without departing from the spirit and scope of the present disclosure. For instance, various features described above with reference to certain embodiments may be combined with other features or may be used with any of the other embodiments.

The invention claimed is:

1. A force sensing multi-axis gimbaled device, comprising:
   (a) a multi-axis movement assembly, comprising:
      (i) an outer pivot plate having an opening;
      (ii) a middle pivot plate having an opening, the middle pivot plate pivotally received within the opening in the outer pivot plate; and
      (iii) an inner pivot plate, the inner pivot plate pivotally received within the opening in the middle pivot plate; and
   (b) a biasing assembly in communication with the multi-axis movement assembly, the biasing assembly configured to impose a first force on the multi-axis movement assembly when the multi-axis movement assembly is pivoted about a first axis, the biasing assembly configured to impose a second force on the multi-axis movement assembly when the multi-axis movement assembly is pivoted about a second axis substantially transverse to the first axis, and the biasing assembly configured to impose a third force on the multi-axis movement assembly when the multi-axis movement assembly is pivoted about a third axis.

2. The device of claim 1, wherein the third force is greater than the first and second forces.

3. The device of claim 1, further comprising a joystick shaft assembly secured to the inner pivot plate, the joystick shaft assembly locatable in a substantially centered position when the multi-axis movement assembly is not pivoted about one of the first, second, and third axes.

4. The device of claim 3, wherein the first, second, and third forces imposed by the biasing assembly urge the joystick shaft assembly toward the substantially centered position.

5. The device of claim 3, wherein the joystick shaft assembly travels a predetermined arc length from the substantially centered position when the multi-axis movement assembly pivots about one of the first, second, and third axes.

6. The device of claim 1, further comprising a travel limiter assembly configured to limit the traveled arc length of the joystick shaft assembly.

7. The device of claim 6, wherein the travel limiter assembly is defined by a pivot pin extending from the inner pivot plate that is moveably receivable within a pivot pin cup defined within the outer pivot plate.

8. The device of claim 6, wherein the travel limiter assembly is defined by a pivot pin extending from the inner pivot plate that is moveably receivable within a pivot pin opening defined within the outer pivot plate.

9. The device of claim 3, further comprising a dampening assembly configured to slow movement of the joystick shaft assembly as it moves toward the substantially centered position.

10. The device of claim 1, wherein the outer, middle, an inner pivot plates are substantially flush when the multi-axis movement assembly is not pivoted about one of the first, second, and third axes.

11. The device of claim 1, further comprising a sensor assembly for sensing the movement of the multi-axis movement assembly.

12. The device of claim 11, wherein the sensor assembly includes at least one sensor chosen from the group consisting of force sensing resistors, optical encoders, two dimensional optical plates, inclinometers, accelerometers, resistive potentiometers, discrete switches, magnetic sensors, or a combination thereof.

13. A force sensing multi-axis gimbaled device, comprising:
   (a) a multi-axis movement assembly, comprising:
      (i) an outer pivot plate having an opening;
      (ii) a middle pivot plate having an opening, the middle pivot plate pivotally received within the opening in the outer pivot plate; and
      (iii) an inner pivot plate, the inner pivot plate pivotally received within the opening in the middle pivot plate;
   (b) a biasing assembly in communication with the multi-axis movement assembly, the biasing assembly configured to impose a first force on the multi-axis movement assembly when the multi-axis movement assembly is pivoted about a first axis, the biasing assembly configured to impose a second force on the multi-axis movement assembly when the multi-axis movement assembly is pivoted about a second axis substantially transverse to the first axis, and the biasing assembly configured to impose a third force on the multi-axis movement assembly when the multi-axis movement assembly is pivoted about a third axis, wherein when the multi-axis movement assembly is pivoted about one of the first, second, and third axes, the multi-axis movement assembly defines an actuation magnitude; and
   (c) a travel limiter assembly configured to limit the actuation magnitude of the multi-axis movement assembly.

14. The device of claim 13, wherein the travel limiter assembly is defined by a pivot pin extending from the inner pivot plate that is moveably receivable within a pivot pin cup defined within the outer pivot plate.

15. The device of claim 13, wherein the travel limiter assembly is defined by a pivot pin extending from the inner pivot plate that is moveably receivable within a pivot pin opening defined within the outer pivot plate.

16. The device of claim 13, wherein the third force is greater than the first and second forces.

17. The device of claim 13, further comprising a joystick shaft assembly secured to the inner pivot plate, the joystick shaft assembly locatable in a substantially centered position when the multi-axis movement assembly is not pivoted about one of the first, second, and third axes.

18. The device of claim 17, further comprising a dampening assembly configured to slow movement of the joystick shaft assembly as it moves toward the substantially centered position.

19. The device of claim 17, wherein the first, second, and third forces imposed by the biasing assembly urge the joystick shaft assembly toward the substantially centered position.

20. The device of claim 13, further comprising a sensor assembly for sensing the movement of the multi-axis movement assembly.

21. The device of claim 20, wherein the sensor assembly includes at least one sensor chosen from the group consisting of force sensing resistors, optical encoders, two dimensional optical plates, inclinometers, accelerometers, resistive potentiometers, discrete switches, magnetic sensors, or a combination thereof.

22. The device of claim 13, wherein the outer, middle, and inner pivot plates are substantially flush when the multi-axis movement assembly is not pivoted about one of the first, second, and third axes.

* * * * *